(12) United States Patent
Aoyama et al.

(10) Patent No.: US 11,816,009 B2
(45) Date of Patent: Nov. 14, 2023

(54) COMMUNICATION SYSTEM

(71) Applicant: DENSO CORPORATION, Kariya (JP)

(72) Inventors: Tetsuya Aoyama, Kariya (JP);
Masakazu Takeichi, Kariya (JP)

(73) Assignee: DENSO CORPORATION, Kariya (JP)

( * ) Notice: Subject to any disclaimer, the term of this patent is extended or adjusted under 35 U.S.C. 154(b) by 329 days.

(21) Appl. No.: 17/350,357

(22) Filed: Jun. 17, 2021

(65) Prior Publication Data

US 2021/0311848 A1    Oct. 7, 2021

Related U.S. Application Data

(63) Continuation of application No. PCT/JP2019/046576, filed on Nov. 28, 2019.

(30) Foreign Application Priority Data

Dec. 19, 2018 (JP) .................... 2018-237459

(51) Int. Cl.
*G06F 11/30* (2006.01)
*H04B 1/16* (2006.01)
(Continued)

(52) U.S. Cl.
CPC ........ *G06F 11/3051* (2013.01); *B60R 16/023* (2013.01); *G06F 11/3006* (2013.01);
(Continued)

(58) Field of Classification Search
CPC ............. G06F 11/3051; G06F 11/3006; G06F 11/3027; G06F 11/0709; G06F 11/0739;
(Continued)

(56) References Cited

U.S. PATENT DOCUMENTS 7,772,806 B2*   8/2010   Kitanaka ................. B60L 58/20
                                                          320/140
9,024,613 B2*   5/2015   Murata .................. H02M 3/156
                                                          323/285
(Continued)

FOREIGN PATENT DOCUMENTS

JP     2014-241575 A     12/2014
JP     2017-052386 A      3/2017

OTHER PUBLICATIONS

"Distributed Systems Interface", [online], DSI Consortium, Jun. 22, 2010, [retrieved on Dec. 11, 2019], Internet: https://www.dsiconsortium.org/downloads/DSI3M_20100617.pdf.
(Continued)

*Primary Examiner* — Dady Chery
(74) *Attorney, Agent, or Firm* — MASCHOFF BRENNAN

(57) ABSTRACT

A communication system includes a primary apparatus and a plurality of secondary apparatuses connected in a daisy chain to the primary apparatus. In each of the secondary apparatuses, a detecting unit detects a current. In response to a switching unit being in an on state, the switching unit allows a current from a primary apparatus to be applied to a detecting unit of at least one other secondary apparatus that is positioned further toward the primary apparatus side than own secondary apparatus is. In response to the switching unit being in an off state, the switching unit allows the current from the primary apparatus not to be applied to the detecting unit of the at least one other secondary apparatus and the detecting unit of the own secondary apparatus. A secondary control unit sets an ID of the secondary apparatus based on a detection result of the detecting unit.

8 Claims, 15 Drawing Sheets

(51) Int. Cl.
*H04L 67/12* (2022.01)
*B60R 16/023* (2006.01)

(52) U.S. Cl.
CPC ....... *G06F 11/3027* (2013.01); *H04B 1/1615* (2013.01); *H04L 67/12* (2013.01)

(58) Field of Classification Search
CPC ............. G06F 11/0754; G06F 2201/81; G06F 11/3013; G06F 11/3048; G06F 11/3058; B60R 16/023; H04B 1/1615; H04L 67/12; H04L 12/28
See application file for complete search history.

(56) References Cited

U.S. PATENT DOCUMENTS 9,583,964 B2 * 2/2017 Murayama .............. H02J 50/60
10,586,177 B1 * 3/2020 Choueiter .............. G06N 3/044

OTHER PUBLICATIONS

"DSI3 Bus Standard Revision 1.00", [online], DSI Consortium, Feb. 16, 2011, [retrieved on Dec. 11, 2019], Internet: https://www.dsiconsortium.org/downloads/DSI3_%a20Bus_Standard_rl.00.pdf.

* cited by examiner

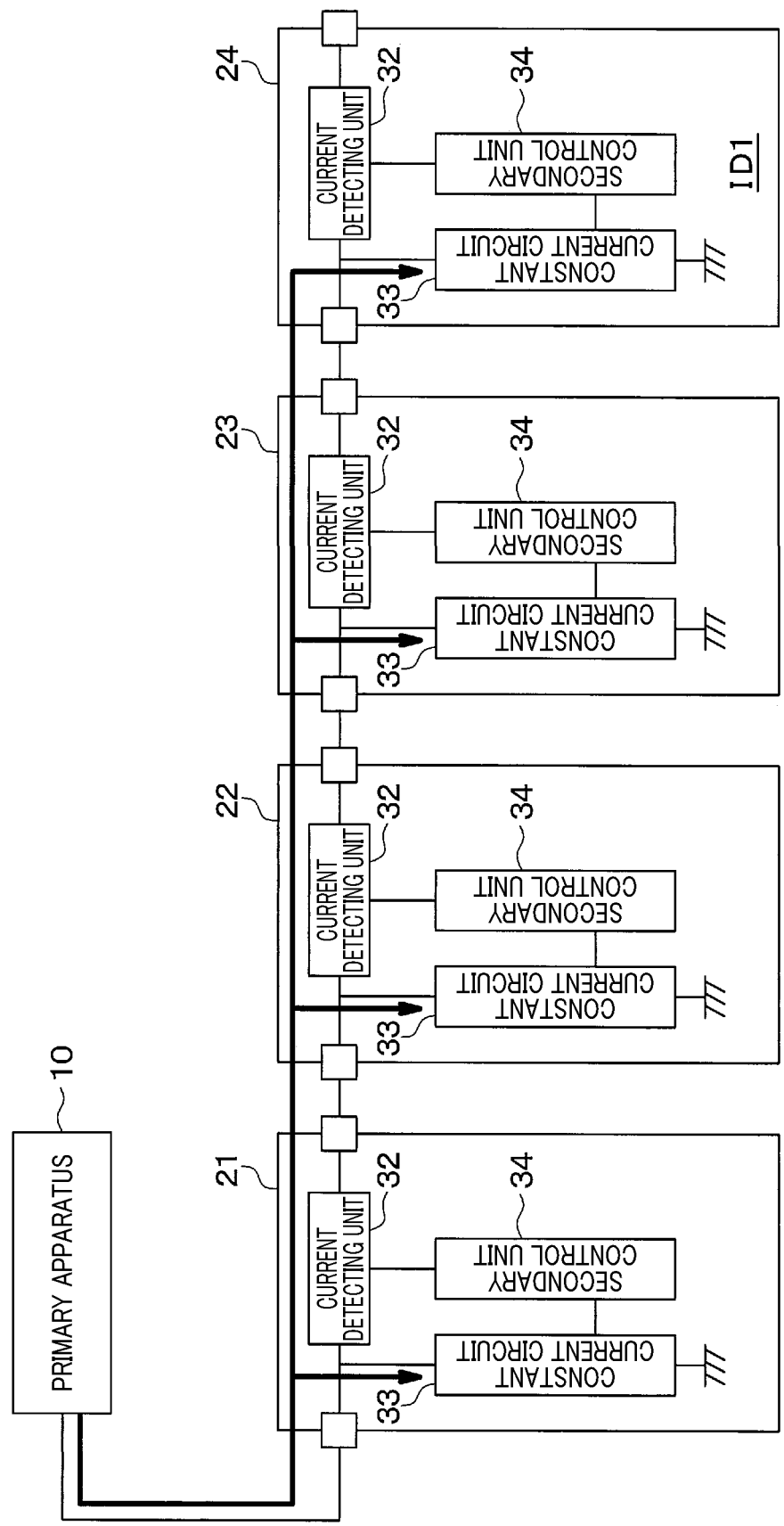

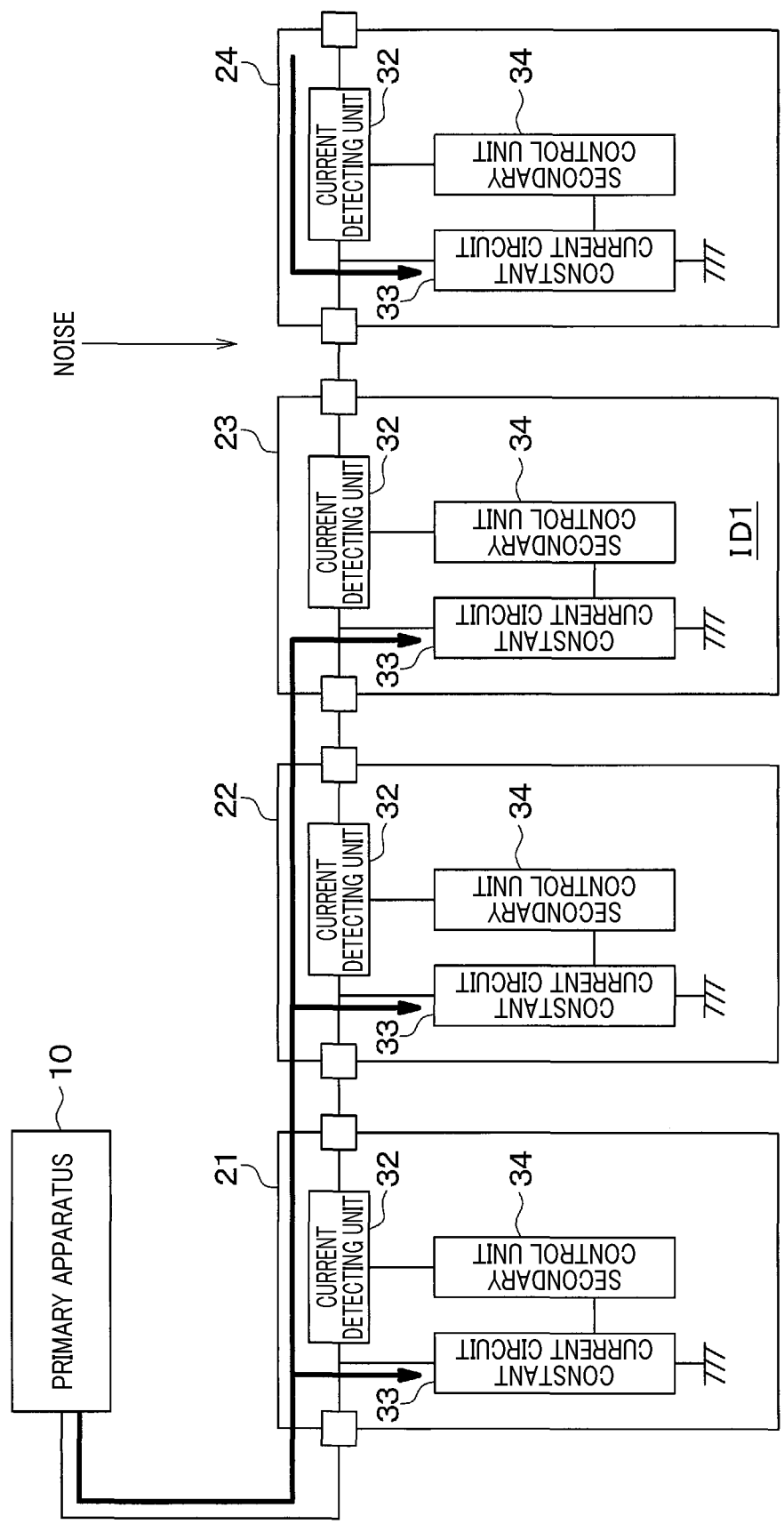

COMMUNICATION SYSTEM

CROSS-REFERENCE TO RELATED APPLICATIONS

The present application is a continuation application of International Application No. PCT/JP2019/046576, filed Nov. 28, 2019, which claims priority to Japanese Patent Application No. 2018-237459, filed Dec. 19, 2018. The contents of these applications are incorporated herein by reference in their entirety.

BACKGROUND

Technical Field

The present disclosure relates to a communication system that includes a primary apparatus and a plurality of secondary apparatuses that are connected in a daisy chain to the primary apparatus.

Related Art

A communication system that includes a primary apparatus and a secondary apparatus has been proposed. Specifically, this communication system can be mounted in a vehicle, and is configured to include an onboard ECU (abbreviation of Electronic Control Unit) that serves as the primary apparatus and a plurality of sensors (such as sonars) that serve as the secondary apparatuses.

SUMMARY

One aspect of the present disclosure provides a communication system that includes a primary apparatus and a plurality of secondary apparatuses connected in a daisy chain to the primary apparatus. Each of the secondary apparatuses includes a detecting unit, switching unit, and a secondary control unit. The detecting unit detects a current. In response to the switching unit being in an on state, the switching unit allows a current from a primary apparatus to be applied to a detecting unit of at least one other secondary apparatus of the secondary apparatuses that is positioned further toward the primary apparatus side than own secondary apparatus of the secondary apparatuses is. In response to the switching unit being in an off state, the switching unit allows the current from the primary apparatus not to be applied to the detecting unit of the at least one other secondary apparatus and the detecting unit of the own secondary apparatus. The secondary control unit sets an ID of the secondary apparatus based on a detection result of the detecting unit.

BRIEF DESCRIPTION OF THE DRAWINGS

In the accompanying drawings:

FIG. 5A is a schematic diagram of a current when constant current circuits are turned on in first to fourth secondary apparatuses;

FIG. 6 is a schematic diagram for explaining an example in which an interchange occurs when ID setting is performed;

DESCRIPTION OF THE EMBODIMENTS

Figure 1:
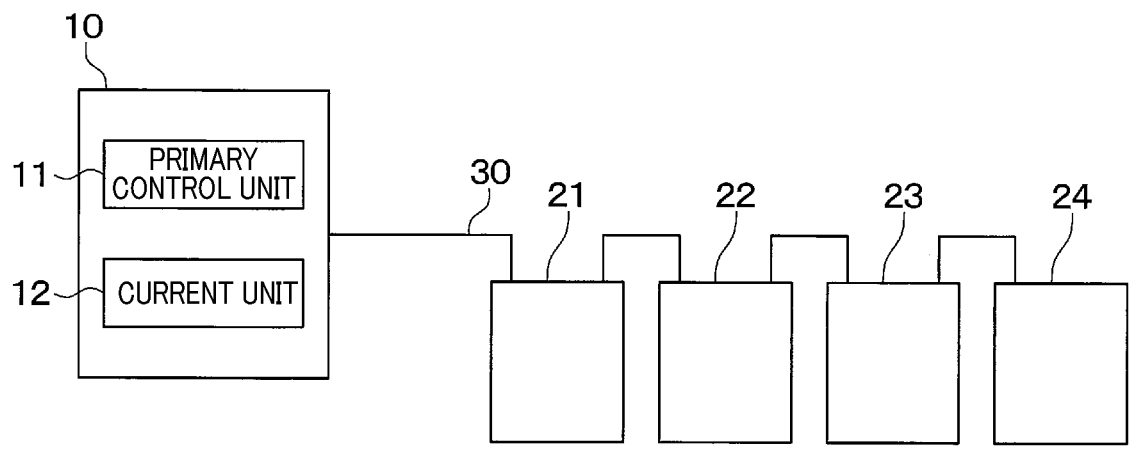
FIG. 1 is a schematic diagram of a communication system according to a present embodiment.

A communication system that includes a primary apparatus and a secondary apparatus has been proposed (for example, refer to JP-A-2017-052386). Specifically, this communication system is mounted in a vehicle, and is configured to include an onboard ECU (abbreviation of Electronic Control Unit) that serves as the primary apparatus and a plurality of sensors (such as sonars) that serve as the secondary apparatuses.

In addition, in each secondary apparatus, specific identification information is set based on a position in which the secondary apparatus is attached, such that the primary apparatus is able to recognize the position of each sensor. Hereafter, the identification information is referred to as ID (abbreviation of identification). As a result, the primary apparatus performs various types of control based on a detection result from each sensor, while recognizing the position of each sensor. Here, for example, the specific ID of each secondary apparatus is set based on an order in which a current for setting the ID no longer flows through the secondary apparatus, or the like.

In addition, for example, in this communication system, when an ignition of the vehicle is turned on, whether an interchange of the secondary apparatuses has occurred is detected by each secondary apparatus being given a provisional ID, and the specific ID and the provisional ID being compared. That is, whether an interchange of the secondary apparatuses has occurred is detected even after the specific ID is set. As a result, even if the secondary apparatuses are interchanged, the primary apparatus is able to recognize the interchange of the secondary apparatuses. Consequently, the primary apparatus can suppress erroneously recognizing the positions of the secondary apparatuses and suppress performing erroneous control.

However, in the above-described communication system, when the specific ID is set, a specific ID that differs from an expected specific ID may be set due to noise and the like. That is, in the above-described communication system, a specific ID that is interchanged with an expected specific ID may be set in the secondary apparatus. An appropriate ID may not be set.

In addition, in the above-described communication system, when the provisional ID is set, a provisional ID that differs from an expected provisional ID may be set due to noise and the like. That is, in the above-described communication system, a provisional ID that is interchanged with an expected provisional ID may be set in the secondary apparatus. An appropriate provisional ID may not be set. Therefore, in this state, confirmation regarding whether an interchange of the secondary apparatuses has occurred may become difficult to appropriately perform.

Furthermore, in such states, the primary apparatus may have difficulty in performing appropriate processes based on the detection results from the secondary apparatuses.

It is thus desired to provide a communication system that is capable of suppressing setting of erroneous IDs in a plurality of secondary apparatuses, and to provide a communication system that is capable of improving confirmation accuracy regarding an ID that is set.

A first aspect of the present disclosure provides a communication system that includes a primary apparatus and a plurality of secondary apparatuses that are connected connected in a daisy chain to the primary apparatus. The primary apparatus includes: a primary control unit that allows the plurality of secondary apparatuses to set their own IDs; and an output unit that applies a current or a voltage to the plurality of secondary apparatuses. Each of the plurality of secondary apparatuses include a detecting unit, a switching unit, and a secondary control unit. The detecting unit detects the current or the voltage.

In response to the switching unit being in an on state, the switching unit allows the current or the voltage from the primary apparatus not to be applied to the detecting unit of own secondary apparatus of the secondary apparatuses while allowing the current or the voltage from the primary apparatus to be applied to the detecting unit of at least one other secondary apparatus of secondary apparatuses that is positioned further toward the primary apparatus side than the own secondary apparatus is.

In response to the switching unit being in an off state, the switching unit allows the current or the voltage from the primary apparatus not to be applied to the detecting unit of the at least one other secondary apparatus that is positioned further toward the primary apparatus side than the own secondary apparatus is and the detecting unit of the own secondary apparatus.

The secondary control unit performs an ID setting process for setting the ID of the secondary apparatus based on a detection result of the detecting unit, based on a setting signal from the primary apparatus. In the ID setting process, the secondary control unit, before the ID is set, turns on the switching unit and sets the ID when the detection result of the detecting unit is equal to or less than a threshold, and after the ID is set, turns off the switching unit and determines that the setting of the ID is abnormal when the detection result of the detecting unit is greater than the threshold.

In the foregoing, when their IDs are set in the plurality of secondary apparatuses, the switching unit of the secondary apparatus in which the ID is not yet set is turned on. The ID is set when the detection result of the detecting unit is equal to or less than the threshold. In addition, when the detection result of the detecting unit of the secondary apparatus in which the ID is set is greater than the threshold, the setting of the ID is determined to be abnormal. Consequently, their IDs can be prevented from being set in an interchanging manner in the plurality of secondary apparatuses.

Furthermore, a second aspect of the present disclosure provides a communication system that includes a primary apparatus and a plurality of secondary apparatuses that are connected in a daisy chain to the primary apparatus. The primary apparatus includes: a primary control unit that allows the plurality of secondary apparatuses to confirm their own IDs that are set; and an output unit that applies a current or a voltage to the plurality of secondary apparatuses. Each of the plurality of secondary apparatuses include a detecting unit, a switching unit, and a secondary control unit. The detecting unit detects the current or the voltage.

In response to the switching unit being in an on state, the switching unit allows the current or the voltage from the primary apparatus not to be applied to the detecting unit of own secondary apparatus of secondary apparatuses while allowing the current or the voltage from the primary apparatus to be applied to the detecting unit of at least one other secondary apparatus of secondary apparatuses that is positioned further toward the primary apparatus side than the own secondary apparatus is. In response to the switching unit being in an off state, the switching unit allows the current or the voltage from the primary apparatus not to be applied to the detecting unit of the own secondary apparatus that is positioned further toward the primary apparatus side than the secondary apparatus is and the detecting unit of the secondary apparatus.

The secondary control unit performs an ID confirmation process for confirming the ID that is set in the secondary apparatus based on a detection result of the detecting unit, based on a confirmation signal from the primary apparatus. In the ID confirmation process, the secondary control unit determines whether an interchange has occurred in the ID that is set, based on a wait period that is based on the ID that is set and the detection result of the detecting unit.

In the foregoing, when their IDs that are set in the plurality of secondary apparatuses are confirmed, whether an interchange of their IDs has occurred is determined based on the wait period that is based on the ID that is set and the detection result of the detecting unit. Consequently, even when an interchange of their IDs of the secondary apparatuses occurs, the interchange of their IDs can be determined with high accuracy.

Embodiments of the present disclosure will hereinafter be described with reference to the drawings. Here, sections among the embodiments below that are identical or equivalent to each other are described using the same reference numbers.

First Embodiment

A first embodiment will be described with reference to the drawings. Here, an example in which a communication system according to the present embodiment is mounted in a vehicle will be described.

First, as shown in FIG. 1, the communication system according to the present embodiment includes a primary apparatus 10 and first to fourth secondary apparatuses 21 to 24. In addition, the first to fourth secondary apparatuses 21 to 24 are connected in a daisy chain to the primary apparatus 10 by a communication line 30. According to the present embodiment, the first to fourth secondary apparatuses 21 to 24 are connected in a daisy chain to the primary apparatus 10 so as to be arrayed in an order of the first secondary apparatus 21, the second secondary apparatus 22, the third secondary apparatus 23, and the fourth secondary apparatus 24 from the primary apparatus 10 side. For example, as a mode of communication between the primary apparatus 10 and the first to fourth secondary apparatuses 21 to 24, a mode according to DSI3 (abbreviation of Distributed Systems Interface) is used.

The primary apparatus 10 includes a primary control unit 11 that has a CPU and a storage unit such as a ROM, a RAM, or a non-volatile RAM (not shown), a current unit 12, and the like. For example, the primary apparatus 10 is configured by an onboard ECU. CPU is an abbreviation of Central Processing Unit. ROM is an abbreviation of Read Only Memory. RAM is an abbreviation of Random Access Memory.

In addition, the primary control unit 11 performs various types of control operations as a result of the CPU reading and running a program (that is, routines described hereafter) from the ROM or the non-volatile RAM. Here, the storage unit such as the ROM or the non-volatile RAM stores therein, in advance, various types of data (such as initial values, look-up tables, and maps) that are used to run the program. Furthermore, a storage medium such as the ROM is a non-transitory computer-readable storage medium.

According to the present embodiment, although described in detail hereafter, the primary control unit 11 performs an ID setting process to allow the first to fourth secondary apparatuses 21 to 24 to set IDs. In addition, according to the present embodiment, the primary control unit 11 transmits an ID setting signal when allowing each secondary control unit 34 to perform an ID setting process. Here, the primary control unit 11 transmits the ID setting signal each time a single secondary control unit 34 sets an ID. Therefore, the storage unit of the primary control unit 11 stores therein a single ID setting period that is required for a single ID to be set.

In addition, according to the present embodiment, the primary control unit 11 performs a predetermined process after the first to fourth secondary apparatuses 21 to 24 perform the ID setting process. Therefore, the storage unit of the primary control unit 11 stores therein all ID setting periods that are required for all of the first to fourth secondary apparatuses 21 to 24 to set their IDs.

Furthermore, although described in detail hereafter, the primary control unit 11 performs an ID confirmation process to allow the first to fourth secondary apparatuses 21 to 24 to confirm their IDs. In addition, according to the present embodiment, the primary control unit 11 performs a predetermined process after the first to fourth secondary apparatuses 21 to 24 perform an ID confirmation process. Therefore, the storage unit of the primary control unit 11 stores therein all ID confirmation periods that are required for all of the first to fourth secondary apparatuses 21 to 24 to confirm their IDs.

The current unit 12 is configured to include a circuit unit that provides a function for sending a current to the first to fourth secondary apparatuses 21 to 24 and detecting a current that flows, and the like. Here, according to the present embodiment, the current unit 12 corresponds to an output unit.

For example, the first to fourth secondary apparatuses 21 to 24 are sonars that are mounted in the vehicle. In addition, the first secondary apparatus 21 is mounted in a front bumper of the vehicle so as to be capable of detecting an obstacle that is positioned ahead of the vehicle. The second secondary apparatus 22 is provided near a door mirror on a left side so as to be capable of detecting an obstacle that is positioned on a left side of the vehicle. The third secondary apparatus 23 is mounted in a rear bumper of the vehicle so as to be capable of detecting an obstacle that is positioned behind the vehicle. The fourth secondary apparatus 24 is provided near a door mirror on a right side so as to be capable of detecting an obstacle that is positioned on a right side of the vehicle. Furthermore, as described above, the first to fourth secondary apparatuses 21 to 24 are connected in a daisy chain to the primary apparatus 10.

Figure 2:
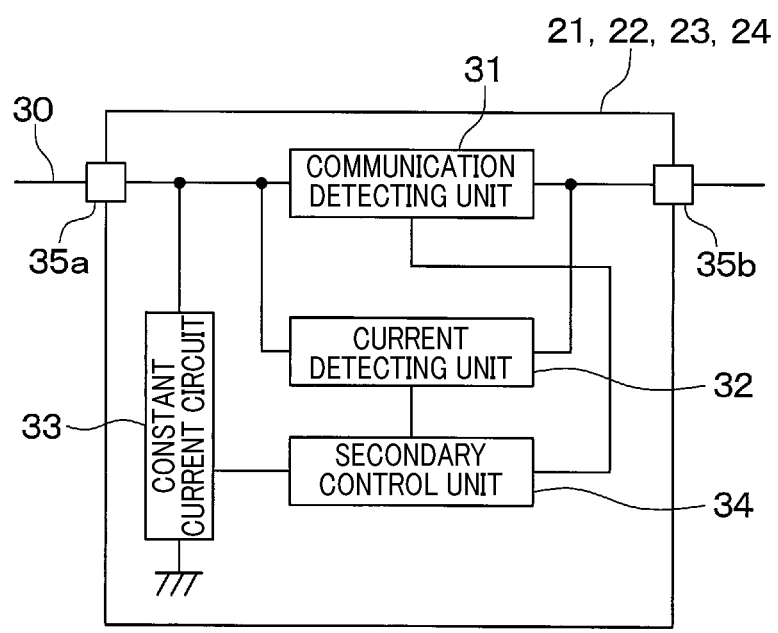
FIG. 2 is a schematic diagram of a configuration of a secondary apparatus in FIG. 1.
Figure 3:
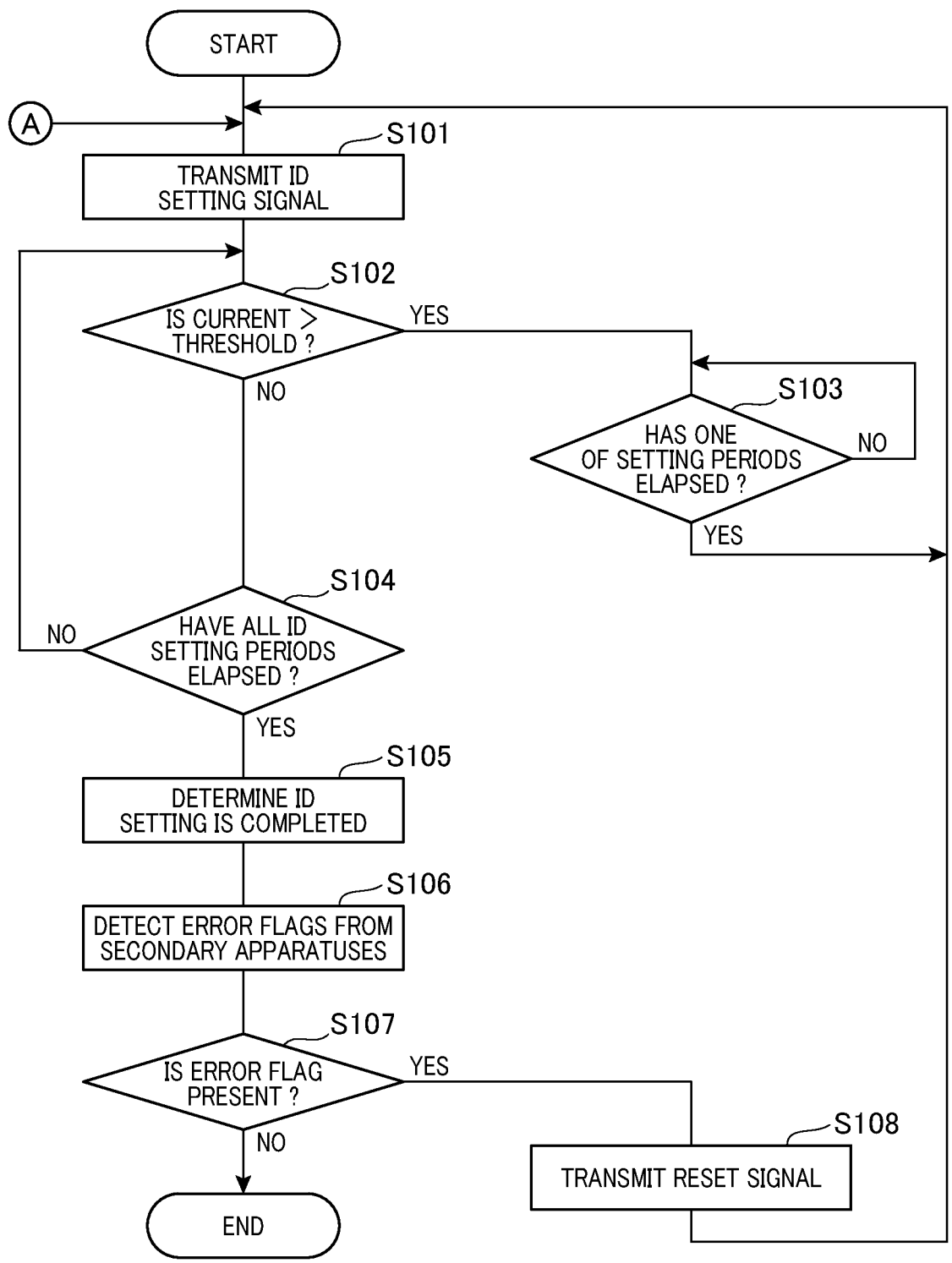
FIG. 3 is a flowchart of an ID setting process performed by a primary control unit.
Figure 4:
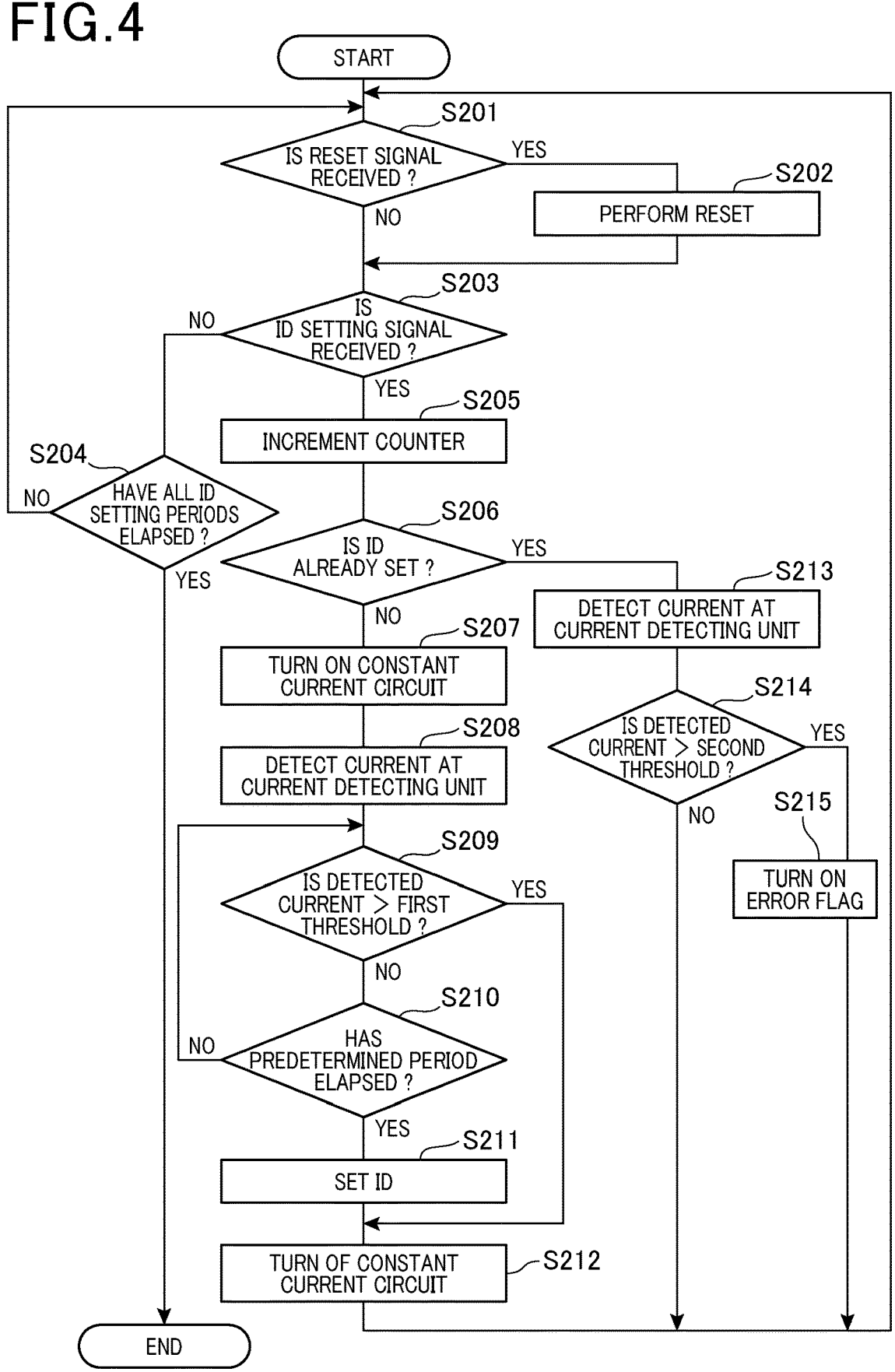
FIG. 4 is a flowchart of an ID setting process performed by a secondary control unit.

The first to fourth secondary apparatuses 21 to 24 have identical configurations. As shown in FIG. 2, the first to fourth secondary apparatuses 21 to 24 include a communication detecting unit 31, a current detecting unit 32, a constant current circuit 33, and a secondary control unit 34. Here, although not particularly shown in FIG. 2, the first to fourth secondary apparatuses 21 to 24 also include a detecting unit that detects an obstacle that is positioned in a vicinity of the vehicle, and the like.

The communication detecting unit 31 is a circuit unit that receives signals including various types of commands that are transmitted from the primary apparatus 10, and is connected to the communication line 30 and the secondary control unit 34. In addition, the communication detecting unit 31 outputs the signals received from the primary control unit 11 to the secondary control unit 34.

The current detecting unit 32 is a circuit unit that detects a current that flows into each of the secondary apparatuses 21 to 24, and is connected to the communication line 30 and the secondary control unit 34. In addition, the current detecting unit 32 detects the current that flows into each of the secondary apparatuses 21 to 24. Here, the current detecting unit 32 is not particularly limited. However, for example, the current detecting unit 32 is configured to have a shunt resistor, a comparator, and the like, and detects a current that flows to the shunt resistor.

The constant current circuit 33 corresponds to a switching unit. The constant current circuit 33 is arranged between the communication line 30 and the ground, and is connected to the secondary control unit 34. In addition, switching between an on state and an off state is performed based on a control signal from the secondary control unit 34.

Furthermore, the constant current circuit 33 is arranged such that, in the on state, the current does not flow to the current detecting unit 32 of the secondary apparatus in which the constant current circuit 33 is provided, while the current flows to the current detecting unit 32 further toward the primary apparatus 10 side than the secondary apparatus, in which the constant current circuit 33 is provided, is. Specifically, according to the present embodiment, the current detecting unit 32 is arranged between an input-side terminal 35a and an output-side terminal 35b. In the constant current circuit 33, one end side is connected between the input-side terminal 35a and the current detecting unit 32, and another end side is connected to the ground.

The secondary control unit 34 is configured to include a CPU and a storage unit such as a ROM, a RAM, or a non-volatile RAM (not shown). In addition, the secondary control unit 34 actualizes various types of control operations as a result of the CPU reading and running a program (that is, routines described hereafter) from the ROM or the non-volatile RAM. Here, the storage unit such as the ROM or the non-volatile RAM stores therein, in advance, various types of data (such as initial values, look-up tables, and maps) that are used to run the program. Furthermore, a storage medium such as the ROM is a non-transitory computer-readable storage medium.

According to the present embodiment, although described in detail hereafter, the secondary control unit 34 performs the ID setting process for setting an ID. In addition, when the ID setting process is performed, the secondary control unit 34 sets the ID based on a value of a counter. Therefore, the storage unit of the secondary control unit 34 stores therein information related to a correspondence relationship between the value of the counter and the ID.

In addition, although described in detail hereafter, the secondary control unit 34 performs a process for setting the ID in the first to fourth secondary apparatuses 21 to 24 in which the secondary control unit 34 is provided. Furthermore, according to the present embodiment, the secondary control unit 34 ends the ID setting process when a period for setting their IDs in all of the first to fourth secondary apparatuses 21 to 24 has elapsed. Therefore, the storage unit of the secondary control unit 34 stores therein all ID setting periods that are required for all of the first to fourth secondary apparatuses 21 to 24 to set their IDs.

Furthermore, although described in detail hereafter, the secondary control unit 34 performs the ID confirmation process for confirming the ID that is set. In addition, when the ID confirmation process is performed, the secondary control unit 34 turns on the constant current circuit 33 after a wait period, that is based on the ID that is set, has elapsed. Therefore, the storage unit of the secondary control unit 34 stores therein information related to the ID that is set and the wait period.

In addition, although described in detail hereafter, the secondary control unit 34 ends the ID confirmation process when a period for performing ID confirmation of all of the first to fourth secondary apparatuses 21 to 24 has elapsed. Therefore, the storage unit of the secondary control unit 34 stores therein all ID confirmation periods that are required for all of the first to fourth secondary apparatuses 21 to 24 to confirm their IDs.

The foregoing is the configuration of the communication system according to the present embodiment. Next, regarding the ID setting process in the above-described communication system, processes performed by the primary control unit 11 and processes performed by the secondary control unit 34 will be described. Here, for example, the ID setting process is performed at a factory before the vehicle is shipped, a dealership, or the like, after the above-described communication system is mounted in the vehicle. However, this is not limited thereto. For example, the ID setting process may be performed after the ignition of the vehicle is turned on.

First, the ID setting process performed by the primary control unit 11 will be described. For example, the primary control unit 11 performs a following process when a signal to perform the ID setting process is inputted from outside, at a factory, a dealership, or the like. In addition, as described hereafter, the following process is performed when a determination that an error flag is set to on is made (that is, YES at step S308) in the ID confirmation process.

At step S101, the primary control unit 11 transmits the ID setting signal to allow the secondary control units 34 of the first to fourth secondary apparatuses 21 to 24 to perform the ID setting process. As a result, as described hereafter, the secondary control units 34 perform the ID setting process.

Next, at step S102, the primary control unit 11 determines whether a current that flows to the first to fourth secondary apparatus 21 to 24 side from the current unit 12 is greater than a threshold. That is, according to the present embodiment, as described hereafter, when the secondary control unit 34 performs the ID setting process, a current flows to the corresponding secondary apparatus from the current unit 12 in response to the constant current circuit 33 being turned on. Therefore, by determining whether the current is flowing at step S102, the primary control unit 11 determines whether the secondary control unit 34 is performing the ID setting process. Here, the threshold is set to a magnitude that is about that of a very small current, and is set to a value that is sufficiently small in relation to the current from the primary apparatus 10.

When determined that the current is greater than the threshold (that is, YES at step S102), the primary control unit 11 determines whether one of the ID setting periods has elapsed at step S103. That is, the primary control unit 11 determines whether one of the secondary control units 34 has ended the ID setting process.

Then, when determined that one of the ID setting periods has not elapsed (that is, NO at step S103), the primary control unit 11 waits until one of the ID setting periods have elapsed. Meanwhile, when determined that the ID setting period has elapsed (that is, NO at step S103), the primary control unit 11 performs the process at step S101 and subsequent steps again.

In addition, when determined that the current is equal to or less than the threshold (that is, NO at step S102), at step S104, the primary control unit 11 determines whether all of the ID setting periods have elapsed. That is, the primary control unit 11 determines that the current is equal to or less than the threshold when all of the secondary control units 34 have performed the ID setting or when one of the secondary control units 34 has ended the ID setting and turned off the constant current circuit 33, in the process by the secondary control unit 34 described hereafter. Therefore, at step S104, the primary control unit 11 identifies a factor that is causing the current to be equal to or less than the threshold by determining whether all of ID setting periods have elapsed.

Then, when determined that all of the ID setting periods have not elapsed (that is, NO at step S104), the primary control unit 11 performs the process at step S102 again. Meanwhile, when determined that all of the ID setting periods have elapsed at step S104 (that is, YES at step S104), the primary control unit 11 determines that the ID setting has been completed in the first to fourth secondary apparatuses 21 to 24 at step S105. Then, at step S106, the primary control unit 11 detects error flags of the first to fourth secondary apparatuses 21 to 24. Here, according to the present embodiment, as described hereafter, the secondary control unit 34 sets the error flag to on when the ID setting is not appropriately performed.

In addition, the primary control unit 11 determines whether an error flag is set to on at step S107. When determined that an error flag is not set to on (that is, NO at step S107), the primary control unit 11 ends the present process. Meanwhile, when determined that an error flag is set to on at step S107 (that is, YES at step S107), the primary control unit 11 transmits a reset signal at step S108 and performs the processes at step S101 and subsequent steps again. That is, the primary control unit 11 allows the secondary control units 34 to repeatedly perform the ID setting process until their IDs are appropriately set in the first to fourth secondary apparatuses 21 to 24. Here, as described hereafter, when the reset signal is received, the secondary control unit 34 performs a reset process in which the error flag and the like are deleted.

The foregoing is the ID setting process performed by the primary control unit 11 according to the present embodiment. Next, the ID setting process performed by the secondary control units 34 of the first to fourth secondary apparatuses 21 to 24 will be described. Here, the secondary control units 34 of the first to fourth secondary apparatuses 21 to 24 each perform the process described below.

The secondary control unit 34 determines whether the reset signal is received at step S201. When determined that the reset signal is received (that is, YES at step S201), the secondary control unit 34 performs reset. According to the present embodiment, the ID is set in each of the secondary apparatuses 21 to 24 by the process described hereafter being performed. However, when the ID setting is not appropriately performed, the error flag is set to on. In addition, when the error flag is set to on, the reset signal is transmitted from the primary control unit 11 and the ID setting is performed again. Therefore, when the reset signal is received, the secondary control unit 34 performs processes such as deleting the error flag and clearing the counter to zero.

When determined that the reset signal is not received (that is, NO at step S201) or after performing reset, at step S203, the secondary control unit 34 determines whether the ID setting signal is received. Then, when determined that the ID setting signal is not received at step S203 (that is, NO at step S203), the secondary control unit 34 determines whether all of the ID setting periods have elapsed at step S204. When determined that all of the ID setting periods have not elapsed (that is, NO at step S204), the secondary control unit 34 performs the processes at step S201 and subsequent steps. Meanwhile, when determined that all of the ID setting periods have elapsed (that is, YES at step S204), the secondary control unit 34 ends the present process.

When determined that the ID setting signal is received (that is, YES at step S203), at step S205, the secondary control unit 34 increments the value of the counter. Next, at step S206, the secondary control unit 34 determines whether the ID is already set. Then, when determined that the ID is not yet set (that is, NO at step S206), the secondary control unit 34 turns on the constant current circuit 33.

Next, at step S208, the secondary control unit 34 detects the current that flows to the current detecting unit 32. At step S209, the secondary control unit 34 determines whether the detected current is greater than a first threshold. Here, the first threshold is set to a magnitude that is about that of a very small current, and is set to a value that is sufficiently small in relation to the current from the primary apparatus 10. That is, at step S209, the secondary control unit 34 determines whether the current from the primary apparatus 10 is flowing to the current detecting unit 32. Here, in a manner similar to the first threshold, second to fourth thresholds described hereafter are set to magnitudes that are about that of a very small current, and are set to values that are sufficiently small in relation to the current from the primary apparatus 10. In this case, the first to fourth thresholds may be a same value or differing values.

In addition, when determined that the detected current is equal to or less than the first threshold (that is, NO at step S209), the secondary control unit 34 determines whether a predetermined period has elapsed at step S210. When determined that the predetermined period has not elapsed (that is, NO at step S210), the secondary control unit 34 performs the process at step S209 again. That is, at step S209 and step S210, the secondary control unit 34 determines whether the detected current becomes greater than the first threshold during the predetermined period.

When determined that the predetermined period has elapsed (that is, YES at step S210), the secondary control unit 34 sets the ID of the secondary apparatus in which the secondary control unit 34 is provided at step S211. According to the present embodiment, as described above, the information related to the correspondence relationship between the value of the counter and the ID is stored in the storage unit. Therefore, the ID setting is performed based on the value of the counter. For example, the secondary control unit 34 sets 1 as the ID when the counter value is 1 and sets 2 as the ID when the counter value is 2.

Then, after setting the ID or when determined that the detected current is greater than the first threshold (that is, YES at step S209), the secondary control unit 34 turns off the constant current circuit 33 at step S212 and performs the processes at step S201 and subsequent steps again.

In addition, when determined that the ID is already set at step S206 (YES at step S206), the secondary control unit 34 detects the current that flows to the current detecting unit 32 at step S213. Then, the secondary control unit 34 determines whether the detected current is greater than the second threshold at step S214.

Then, when determined that the detected current is greater than the second threshold (that is, YES at step S214), the secondary control unit 34 performs the processes at step S201 and subsequent steps after setting the error flag to on. That is, according to the present embodiment, because the ID is set as described above, as described hereafter, when the ID is normally set, the ID is set in the order of the fourth secondary apparatus 24, the third secondary apparatus 23, the second secondary apparatus 22, and the first secondary apparatus 21. In addition, the constant current circuit 33 of the secondary apparatus in which the ID is set is not turned on. Therefore, the current flows to the secondary apparatus in which the ID is set when the ID is not appropriately set, such as when the order in which the ID is set is interchanged. Therefore, when determined that the detected current is greater than the second threshold at step S214, the secondary control unit 34 sets the error flag to on. Meanwhile, when determined that the detected current is equal to or less than the second threshold (that is, NO at step S214), the secondary control unit 34 immediately performs the processes at step S201 and subsequent steps.

The foregoing is the ID setting process performed by the secondary control unit 34. Next, the current that flows to the first to fourth secondary apparatuses 21 to 24 and the like when the above-described ID setting process is performed will be described with reference to FIGS. 5A to 5D and 6. Here, in FIGS. 5A to 5D and 6, the communication detecting unit 31 and the like are omitted.

According to the present embodiment, because the secondary control units 34 perform the above-described process, the current that flows to the first to fourth secondary apparatuses 24 is as follows.

First, when the secondary control units 34 of the first to fourth secondary apparatuses 21 to 24 have not already set their IDs, the constant current circuits 33 are turned on in all of the secondary apparatuses 21 to 24. In this case, as shown in FIG. 5A, the current from the primary apparatus 10 flows to the current detecting units 32 of the first to third secondary apparatuses 21 to 23 and flows to the constant current circuits 33 of the first to fourth secondary apparatuses 21 to 24. Therefore, the secondary control unit 34 of the fourth secondary apparatus 24 sets the ID because the current does not flow to the current detecting unit 32 of the fourth secondary apparatus 24. In this case, for example, the secondary control unit 34 of the fourth secondary apparatus 24 sets 1 as the ID because the value of the counter is 1.

Figure 5B:
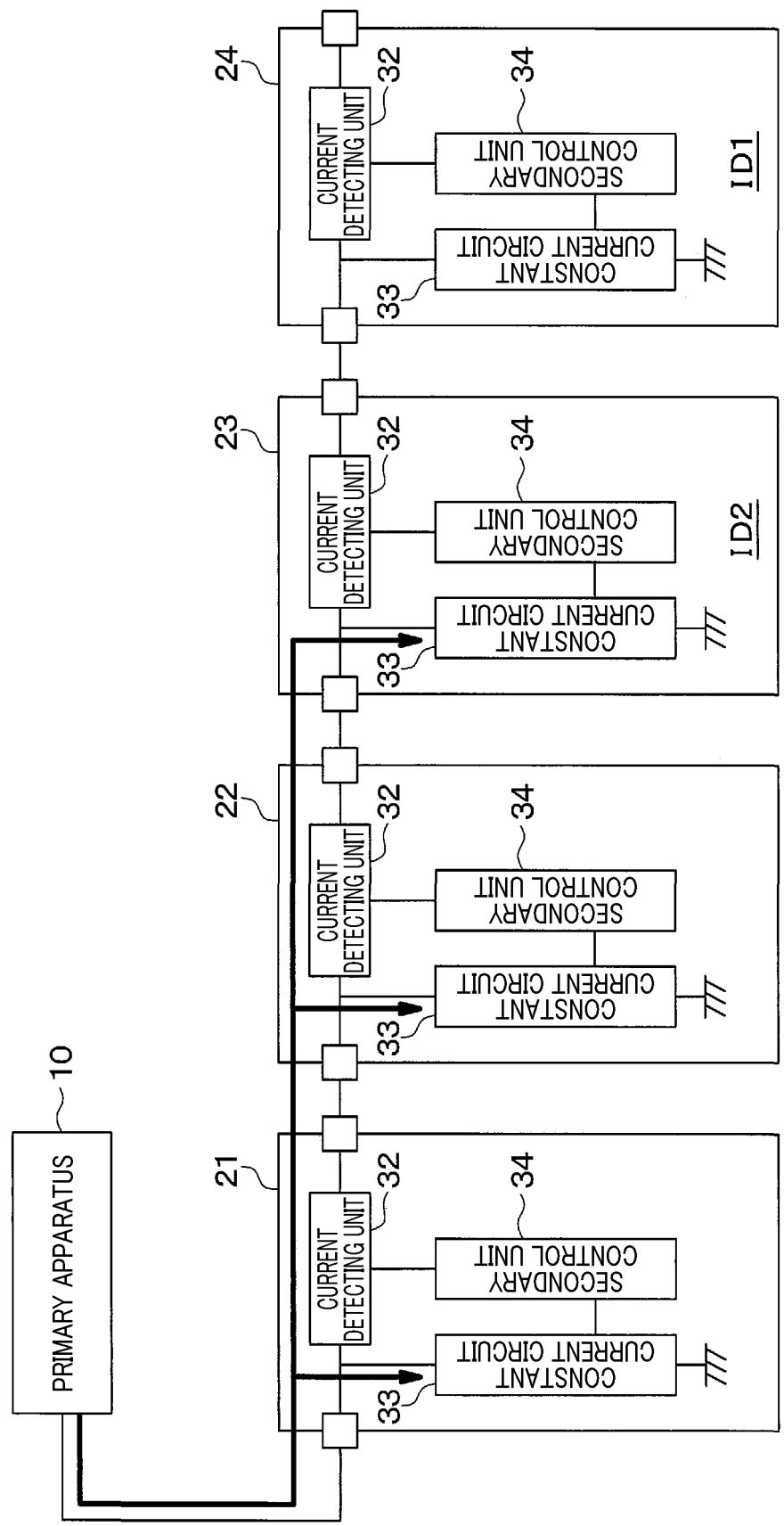
FIG. 5B is a schematic diagram of a current when the constant current circuits are turned on in the first to third secondary apparatuses.

In addition, when the secondary control units 34 of the first to third secondary apparatuses 21 to 23 have not already set their IDs and the secondary control unit 34 of the fourth secondary apparatus 24 has already set the ID, the constant current circuits 33 are turned on in the first to third secondary apparatuses 21 to 23. In this case, as shown in FIG. 5B, the current from the primary apparatus 10 flows to the current detecting units 32 of the first and second secondary apparatuses 21 and 22 and flows to the constant current circuits 33 of the first to third secondary apparatuses 21 to 23. Therefore, the secondary control apparatus 34 of the third secondary apparatus 23 sets the ID because the current does not flow to the current detecting unit 32 of the third secondary apparatus 23. In this case, for example, the secondary control unit 34 of the third secondary apparatus 23 sets 2 as the ID because the value of the counter is 2.

Figure 5C:
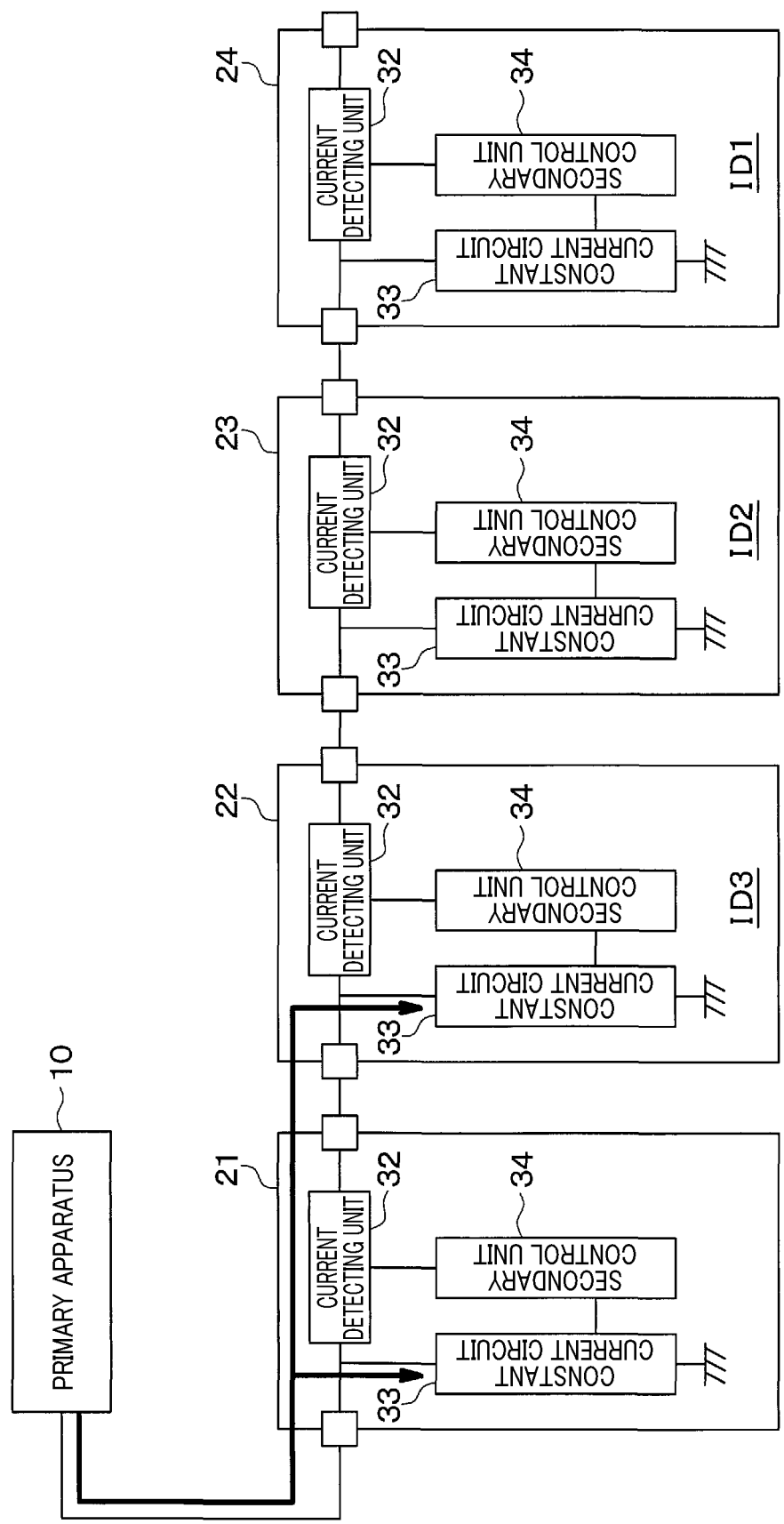
FIG. 5C is a schematic diagram of a current when the constant current circuits are turned on in the first and second secondary apparatuses.

Furthermore, when the secondary control units 34 of the first and second secondary apparatuses 21 and 22 have not already set their IDs and the secondary control units 34 of the third and fourth secondary apparatuses 23 and 24 have already set their IDs, the constant current circuits 33 are turned on in the first and second secondary apparatuses 21 and 22. In this case, as shown in FIG. 5C, the current from the primary apparatus 10 flows to the current detecting unit 32 of the first secondary apparatus 21 and flows to the constant current circuits 33 of the first and second secondary apparatuses 21 and 22. Therefore, the secondary control unit 34 of the second secondary apparatus 22 sets the ID because the current does not flow to the current detecting unit 32 of the second secondary apparatus 24. In this case, for example, the secondary control unit 34 of the third secondary apparatus 23 sets 3 as the ID because the value of the counter is 3.

Figure 5D:
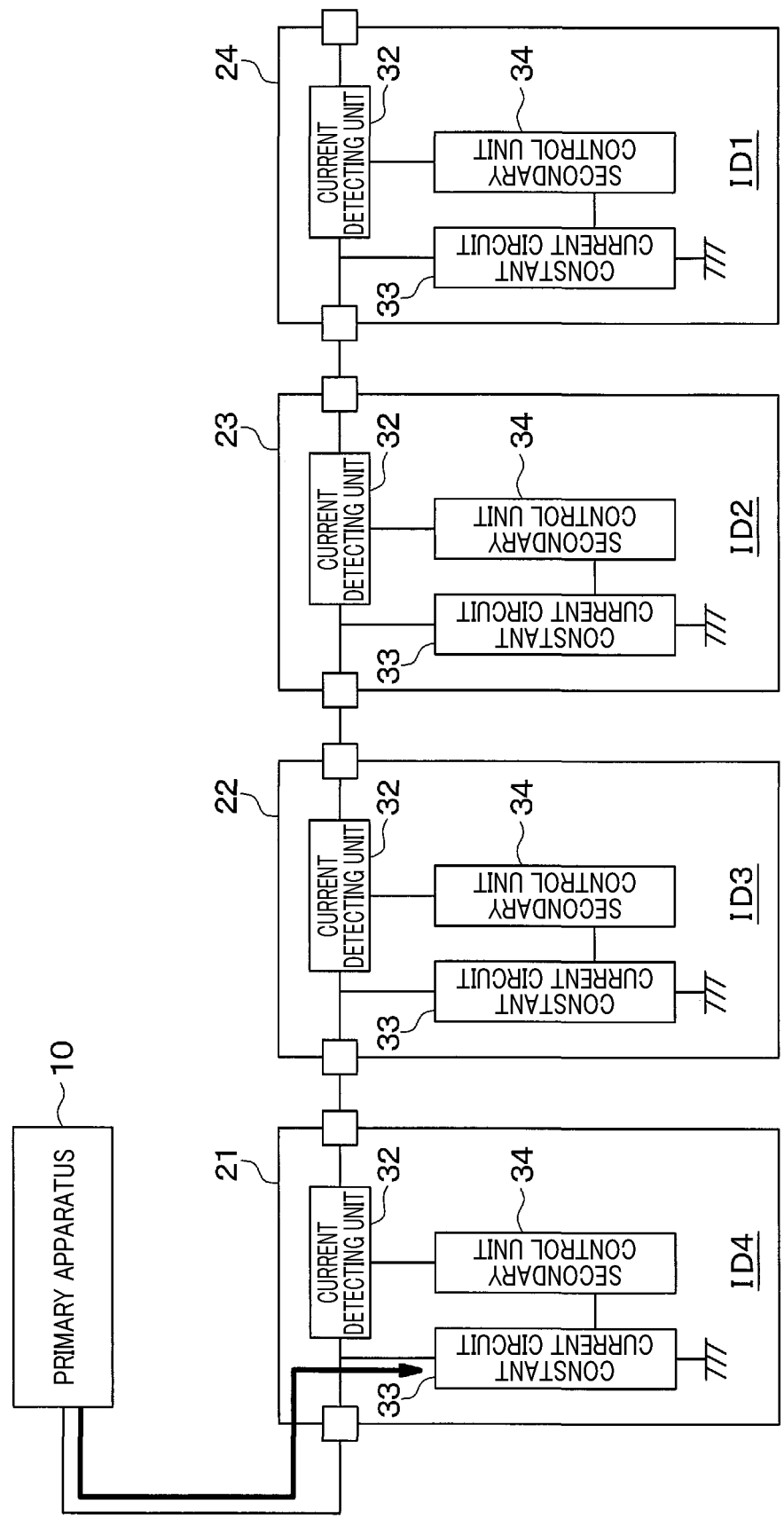
FIG. 5D is a schematic diagram of a current when the constant current circuit is turned on in the first secondary apparatus.

In addition, when the secondary control unit 34 of the first secondary apparatus has not already set the ID and the secondary control units 34 of the second to fourth secondary apparatuses 22 to 24 have already set their IDs, the constant current circuit 33 is turned on in the first secondary apparatus 21. In this case, as shown in FIG. 5D, the current from the primary apparatus 10 flows only to the constant current circuit 33 of the first secondary apparatus 21 and does not flow to the current detecting units 32. Therefore, the secondary control unit 34 of the first secondary apparatus 21 sets the ID because the current does not flow to the current detecting unit 32 of the first secondary apparatus 21. In this case, for example, the secondary control unit 34 of the third secondary apparatus 23 sets 4 as the ID because the value of the counter is 4.

That is, according to the present embodiment, the first to fourth secondary apparatuses 21 to 24 perform the ID setting in the order of the fourth secondary apparatus 24, the third secondary apparatus 23, the second secondary apparatus 22, and the first secondary apparatus 21. In addition, in the secondary apparatus in which the ID setting is performed, the constant current circuit 33 is not turned on. Therefore, in the communication system according to the present embodiment, when the ID is normally set, the current does not flow to the current detecting unit 32 of the secondary apparatus in which the ID is set.

However, the ID setting may be performed in an interchanging manner, due to noise and the like. For example, as shown in FIG. 6, even when all of the constant current circuits 33 are turned on, a state in which the current flows to the current detecting unit 32 of the fourth secondary apparatus 24 and the current does not flow to the current detecting unit 32 of the third secondary apparatus 23 may occur due to noise. In this case, the secondary control unit 34 of the third secondary apparatus 23 sets the ID and the secondary control unit 34 of the fourth secondary apparatus 24 does not set the ID. That is, for example, 1 may be set as the ID in the third secondary apparatus 23.

In addition, for example, when the processes at step S201 and subsequent steps are performed for a second time, the secondary control unit 34 of the third secondary apparatus 23 determines that the ID is already set at step S206. Meanwhile, the secondary control unit 34 of the fourth secondary apparatus 24 determines that the ID is not already set at step S206. Therefore, in the third secondary apparatus 23, regardless of the ID setting having ended, the current flows to the current detecting unit 32 because the constant current circuit 33 is turned on in the fourth secondary apparatus 24. As a result, in a case such as this, the secondary control unit 34 of the third secondary apparatus 23 sets the error flag to on and enables the primary control unit 11 to recognize that the ID setting has not been appropriately performed. Then, when the error flag is set to on, the primary control unit 11 transmits the reset signal and transmits the ID setting signal again. Therefore, according to the present embodiment, their IDs can be prevented from being set in an interchanging manner in the secondary apparatuses 21 to 24.

Next, regarding the ID confirmation process in the above-described communication system, processes performed by the primary control unit 11 and processes performed by the secondary control unit 34 will be described. That is, according to the present embodiment, because the ID setting is performed as described above, their IDs can be prevented from being set in an interchanging manner in the secondary apparatuses 21 to 24. However, the ID that is set may become a value that is interchanged due to noise and the like. Therefore, according to the present embodiment, the ID confirmation process below is performed. Here, the primary control unit 11 performs the process below when a current time is determined to be a predetermined timing.

First, according to the present embodiment, their IDs are set in the first to fourth secondary apparatuses 21 to 24 as described above. Therefore, for example, the ID of the fourth secondary apparatus 24 is set to 1, the ID of the third secondary apparatus 23 is set to 2, the ID of the second secondary apparatus 22 is set to 3, and the ID of the first secondary apparatus 21 is set to 4. That is, in a case such as this, their IDs of the first to fourth secondary apparatuses 21 to 24 decrease in order from the primary apparatus 10 side. Therefore, hereafter, their IDs being set in this manner is also referred to as their IDs being set in descending order.

In addition, after their IDs are set as described above, the order of their IDs that are set may be intentionally interchanged based on arrangement locations of the first to fourth secondary apparatuses 21 to 24 and the like. That is, for example, the ID of the fourth secondary apparatus 24 may be set to 4, the ID of the third secondary apparatus 23 may be set to 3, the ID of the second secondary apparatus 22 may be set to 2, and the ID of the first secondary apparatus 21 may be set to 1. In a case such as this, their IDs of the first to fourth secondary apparatuses 21 to 24 increase in order from the primary apparatus 10 side. Therefore, hereafter, their IDs being set in this manner is also referred to as their IDs being set in ascending order.

Furthermore, in the storage unit of the primary control unit 11, whether their IDs of the first to fourth secondary apparatuses 21 to 24 are set in descending order or set in ascending order is stored.

Figure 7:
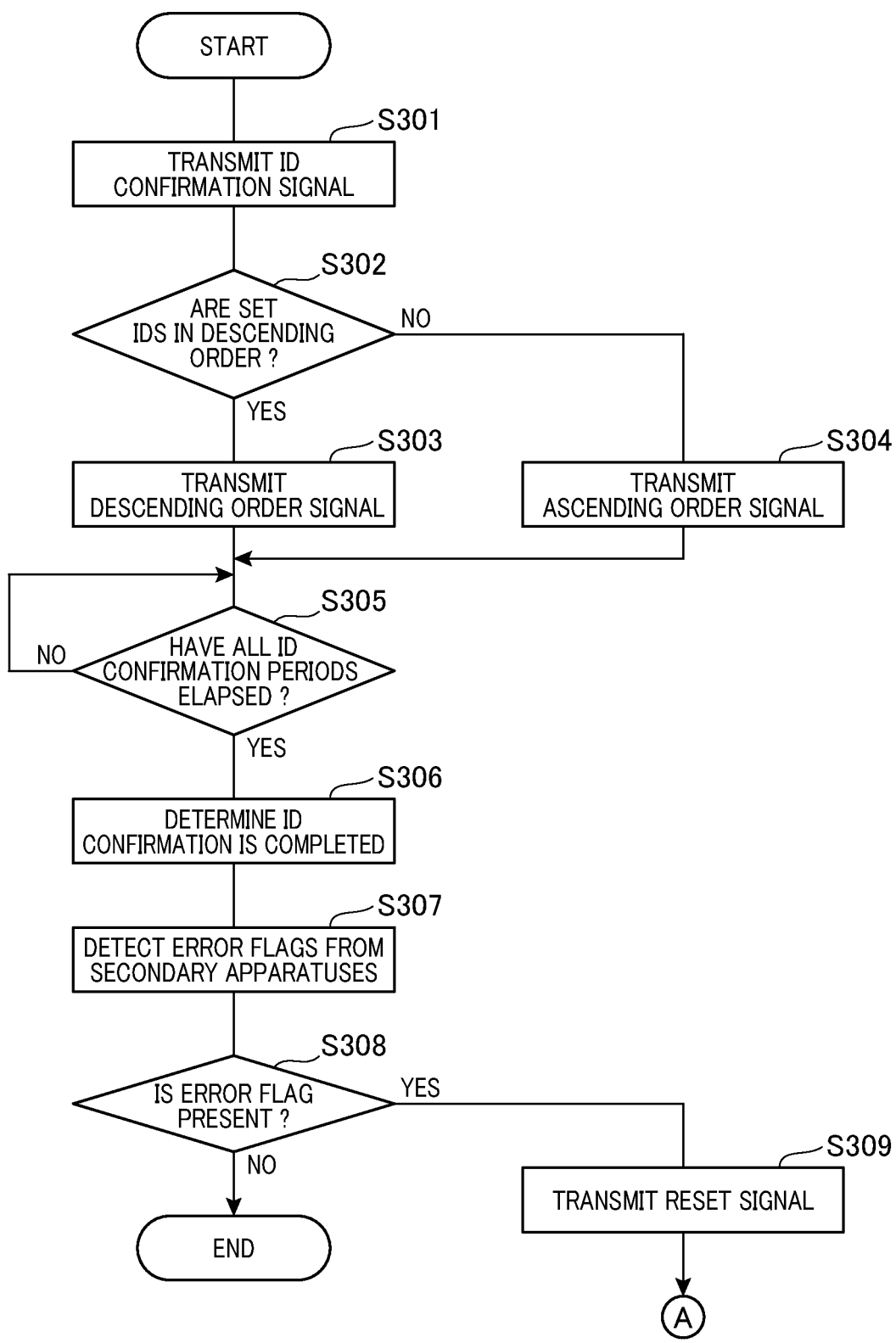
FIG. 7 is a flowchart of an ID confirmation process performed by the primary control unit.
Figure 8:
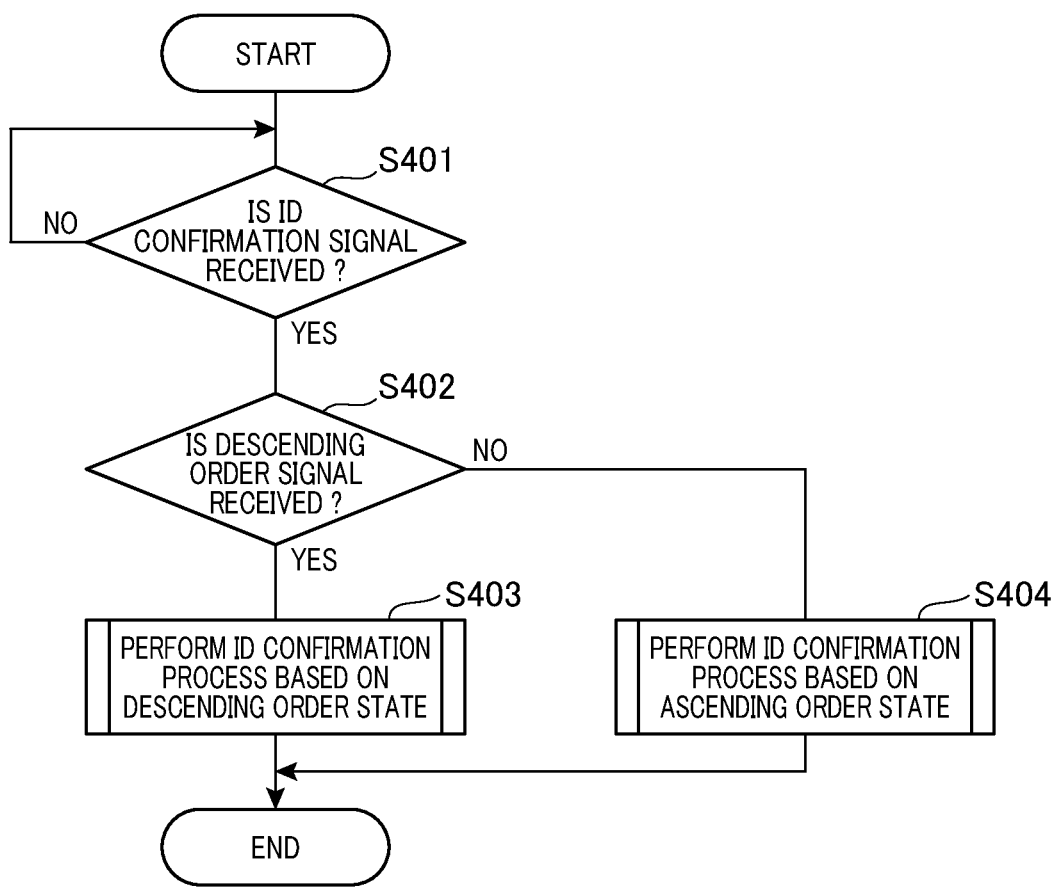
FIG. 8 is a flowchart of an ID confirmation process performed by the secondary control unit.

First, the ID confirmation process performed by the primary control unit 11 will be described with reference to FIG. 7.

When determined that the current time is a timing for performing the ID confirmation process, at step S301, the primary control unit 11 transmits an ID confirmation signal to the first to fourth secondary apparatuses 21 to 24. As a result, as described hereafter, the secondary control units 34 perform the ID confirmation process.

Here, for example, the primary control unit 11 determines that the current time is the timing for performing the ID confirmation process after elapse of a predetermined period after the ignition of the vehicle is turned on. In this case, the primary control unit 11 may be configured to determine that the current time is the timing for performing the ID confirmation process every time the predetermined period has elapsed.

In addition, for example, the primary control unit 11 may determine that the current time is the timing for performing the ID confirmation process when a passenger performs an operation to perform the ID confirmation process. Furthermore, for example, the primary control unit 11 determines that the current time is the timing for performing the ID confirmation process during parking, high-speed traveling, and the like when a necessity for the detecting units (not shown) in the first to fourth secondary apparatuses 21 to 24 to detect an obstacle is low.

Then, at step S302, the primary control unit 11 determines whether their IDs of the first to fourth secondary apparatuses 21 to 24 are set in descending order. When determined that their IDs that are set are in descending order (that is, YES at step S302), the primary control unit 11 transmits a descending order signal at step S303. Meanwhile, when determined that their IDs that are set are not in descending order (that is, NO at step S302), that is, when determined that their IDs that are set are in ascending order, the primary control unit 11 transmits an ascending order signal at step S304.

Then, after transmitting the descending order signal or after transmitting the ascending order signal, at step S305, the primary control unit 11 determines whether all of the ID confirmation periods have elapsed. When determined that all of the ID confirmation periods have not elapsed (that is, NO at step S305), the primary control unit 11 waits until all of the ID confirmation periods have elapsed. Meanwhile, when determined that all of the ID confirmation periods have elapsed (that is, YES at step S305), the primary control unit 11 determines that ID confirmation of the first to fourth secondary apparatuses 21 to 24 is completed at step S306. Then, at step S307, the primary control unit 11 detects the error flags of the first to fourth secondary apparatuses 21 to 24. Here, according to the present embodiment, as described hereafter, the secondary control unit 34 sets the error flag to on when an interchange of their IDs has occurred.

Then, the secondary control unit 34 determines whether an error flag is set to on at step S308. When determined that an error flag is not set to on (that is, NO at step S308), the secondary control unit 34 ends the present process. Meanwhile, when determined that an error flag is set to on at step S308 (that is, YES at step S308), the secondary control unit 34 transmits the reset signal at step S309, and performs the process at step S101. That is, when the error flag is set to on in any of the first to fourth secondary apparatuses 21 to 24, the primary control unit 11 allows the secondary control units 34 to perform the ID setting again.

The foregoing is the ID confirmation process performed by the primary control unit 34 according to the present embodiment. Next, the ID confirmation process performed by the secondary control units 34 of the first to fourth secondary apparatuses 21 to 24 will be described. Here, the secondary control units 34 of the first to fourth secondary apparatuses 21 to 24 each perform the process below.

First, at step S401, the secondary control unit 34 determines whether the ID confirmation signal is received. Then, when determined that the ID confirmation signal is not received (that is, NO at step S401), the secondary control unit 34 waits until the ID confirmation signal is received. Meanwhile, when the ID confirmation signal is received (that is, YES at step S401), the secondary control unit 34 determines whether the descending order signal is received at step S402.

Then, when determined that the descending order signal is received (that is, YES at step S402), the secondary control unit 34 performs the ID confirmation process based on a descending order state at step S403 and ends the present process. In contrast, when determined that the descending order signal is not received (that is, NO at step S402), because the ascending order signal is received, the secondary control unit 34 performs the ID confirmation process based on an ascending order state at step S404 and ends the present process.

Figure 9:
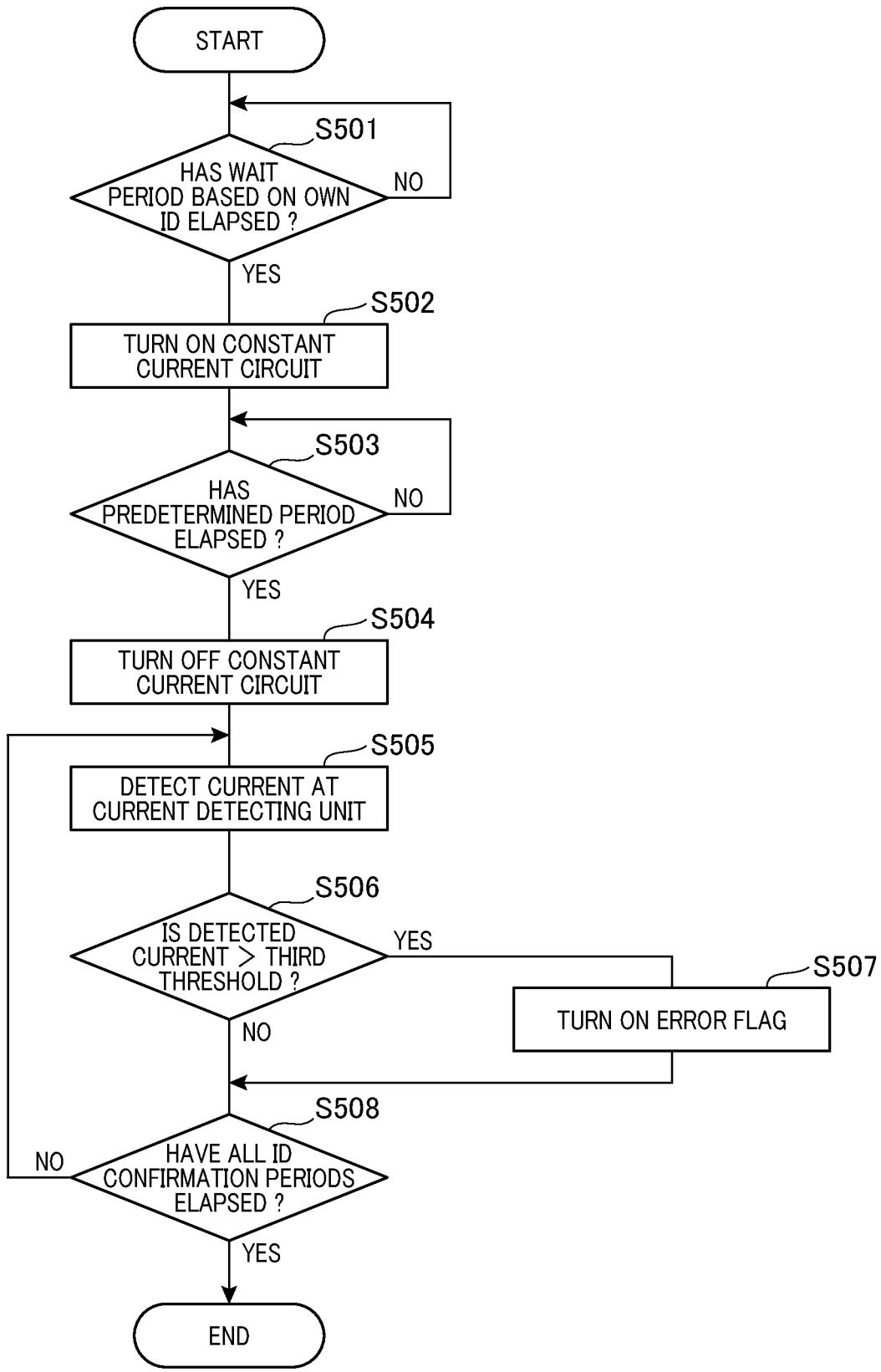
FIG. 9 is a flowchart of an ID confirmation process in a descending order state performed by the secondary control unit.

Next, the ID confirmation process based on the descending order state performed by the secondary control unit 34 at step S403 will be described with reference to FIG. 9.

At step S501, the secondary control unit 34 determines whether a wait period that is based on the ID of the secondary apparatus in which the secondary control unit 34 is provided has elapsed. Here, according to the present embodiment, the wait period is set to be longer as the ID increases. Therefore, when their IDs are set in the first to fourth secondary apparatuses 21 to 24 in descending order, the wait period becomes longer in the order of the fourth secondary apparatus 24, the third secondary apparatus 23, the second secondary apparatus 22, and the first secondary apparatus 21.

Then, when determined that the wait period has not elapsed (that is, NO at step S501), the secondary control unit 34 waits until the wait period has elapsed. Therefore, when their IDs are set in descending order in the first to fourth secondary apparatuses 21 to 24, the wait period is determined to have elapsed at step S501 in the order of the secondary control units 32 provided in the fourth secondary apparatus 24, the third secondary apparatus 23, the second secondary apparatus 22, and the first secondary apparatus 21.

Then, when determined that the wait period has elapsed (that is, YES at step S501), the secondary control unit 34 turns on the constant current circuit 33 at step S502 and determines whether a predetermined period has elapsed at step S503. When determined that the predetermined period has not elapsed (that is, NO at step S503), the secondary control unit 34 waits. When determined that the predetermined period has elapsed (that is, YES at step S503), the secondary control unit 34 turns off the constant current circuit 33 at step S504.

Next, the secondary control unit 34 detects the current that flows to the current detecting unit 32 at step S505 and determines whether the detected current is greater than the third threshold at step S506. Then, when determined that the detected current is greater than the third threshold (that is, YES at step S506), the secondary control unit 34 sets the error flag to on.

Meanwhile, when determined that the detected current is equal to or less than the third threshold (that is, NO at step S506) or after setting the error flag to on, the secondary control unit 34 determines whether all of the ID confirmation periods have elapsed at step S508. When determined that all of the ID confirmation periods have not elapsed (that is, NO at step S508) the secondary control unit 34 performs the processes at step S505 and subsequent steps again. Meanwhile, when determined that all of the ID confirmation periods have elapsed, the secondary control unit 34 ends the present process.

The foregoing is the ID confirmation process in the descending order state performed by the secondary control units 34. In summary, when their IDs are set in descending order in the first to fourth secondary apparatuses 21 to 24, the wait period is determined to have elapsed at step S501 in the order of the secondary control units 34 in the fourth secondary apparatus 24, the third secondary apparatus 23, the second secondary apparatus 22, and the first secondary apparatus 21.

In addition, when the wait periods have elapsed in this order, if the ID is normally set, the current does not flow to the current detecting unit 32 of the secondary apparatus of which the wait period has elapsed. Therefore, when the current flows to the current detecting unit 32 after the wait period of the secondary control unit 34 has elapsed, the secondary control unit 34 sets the error flag to on.

Figure 10:
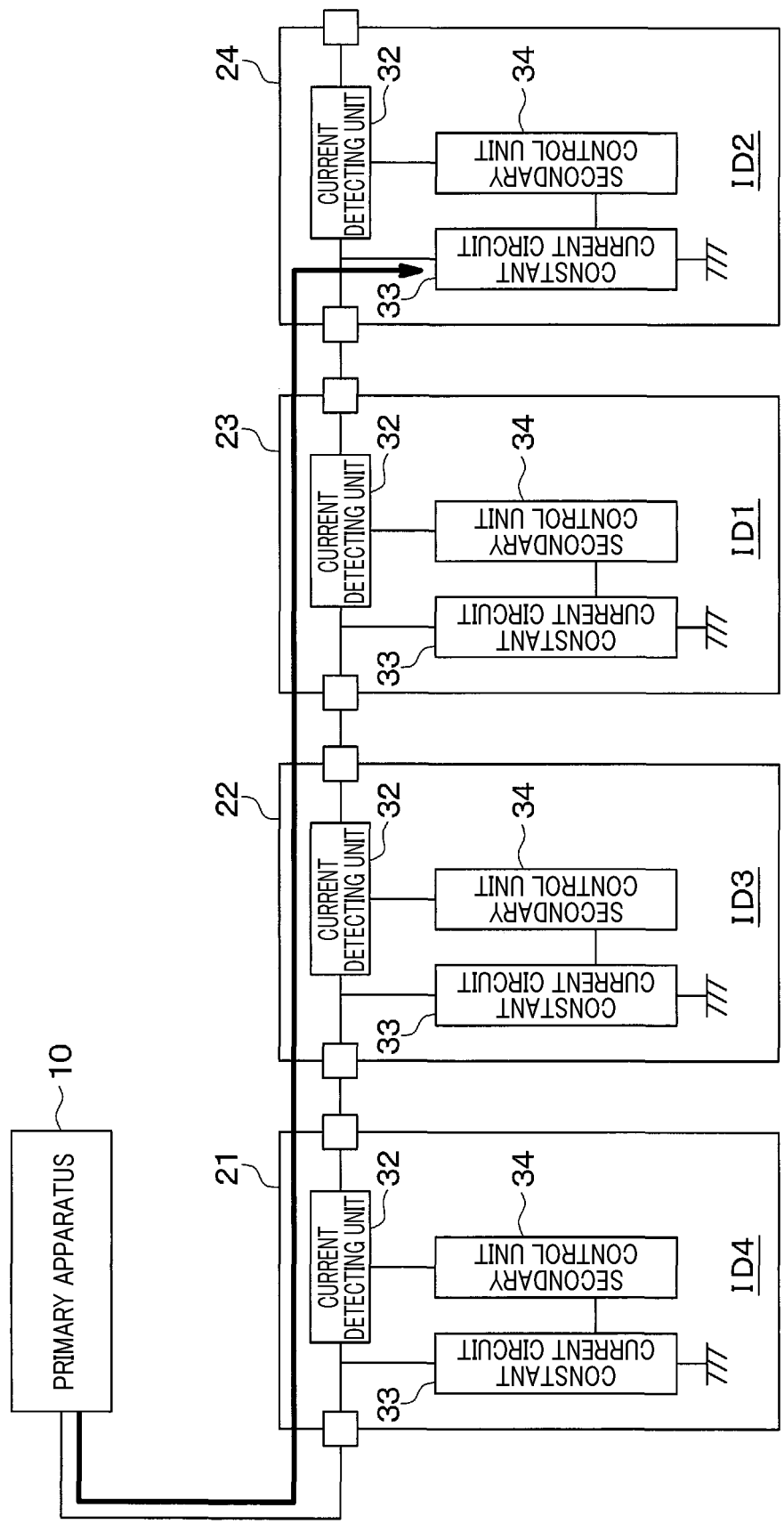
FIG. 10 is a schematic diagram for explaining an example in which an interchange occurs when an ID that is set is confirmed.

For example, as shown in FIG. 10, 4 is set as the ID of the first secondary apparatus 21 and 3 is set as the ID of the second secondary apparatus 22. In addition, 1 is set as the ID of the third secondary apparatus 23 and 2 is set as the ID of the fourth secondary apparatus 24.

In this case, the wait period of the fourth secondary apparatus 24 has elapsed after the wait period of the third secondary apparatus 23 has elapsed. The current flows to the current detecting unit 32 in the third secondary apparatus 23 after the wait time has elapsed. Therefore, in a case such as this, the secondary control unit 34 of the third secondary apparatus 24 sets the error flag to on. As a result, the primary control unit 11 determines that the error flag is present at step S308, and performs the process to allow the secondary control units 34 to perform the ID setting again. Therefore, the primary control unit 11 suppresses performing various types of control based on erroneous IDs.

Figure 11:
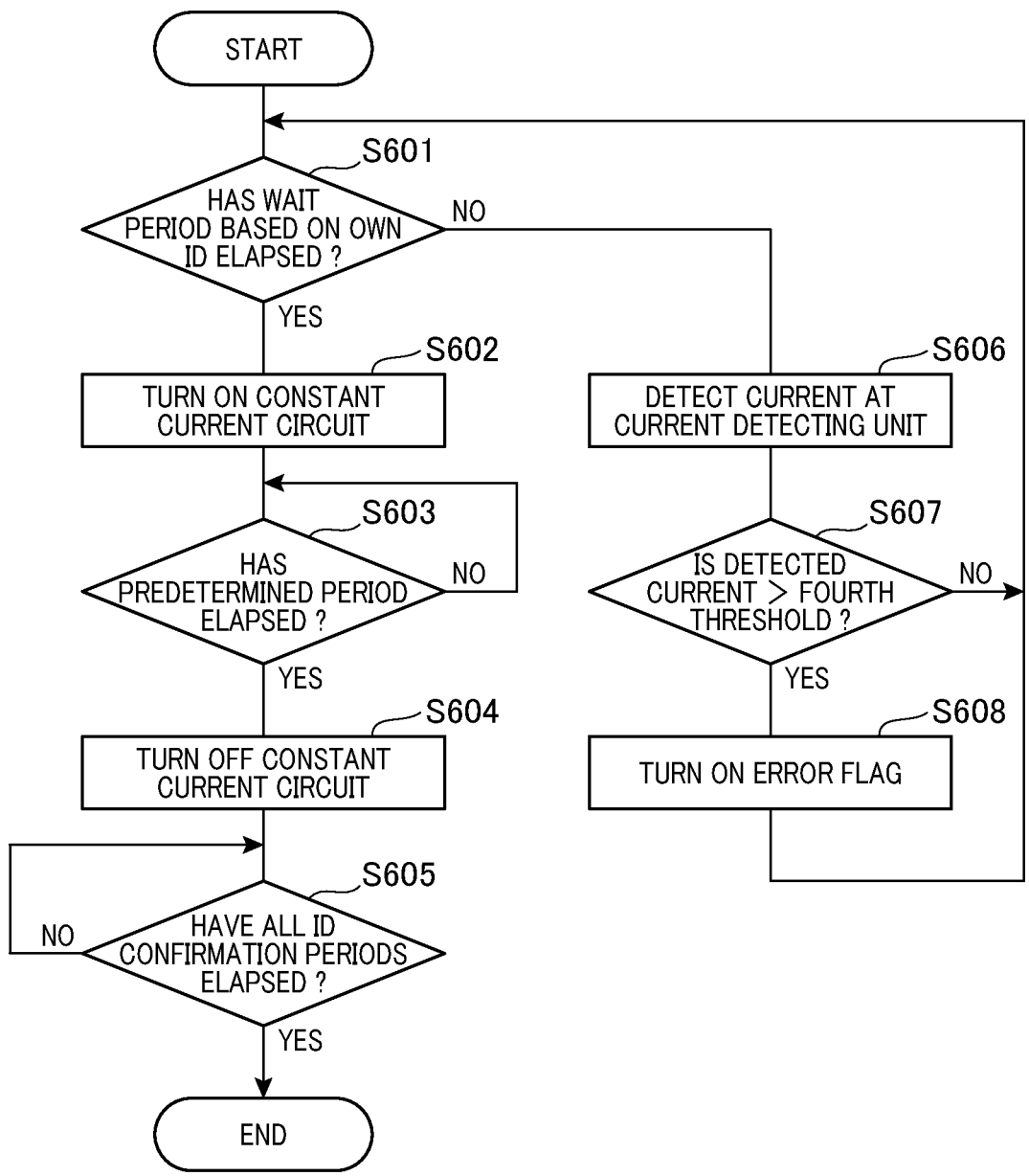
FIG. 11 is a flowchart of an ID confirmation process in an ascending order state performed by the secondary control unit.

Next, the ID confirmation process based on the ascending order state performed by the secondary control unit 34 at step S404 will be described with reference to FIG. 11.

At step S601, the secondary control unit 34 determines whether a wait period that is based on the ID of the secondary apparatus in which the secondary control unit 34 is provided has elapsed. Here, when their IDs are set in ascending order in the first to fourth secondary apparatuses 21 to 24, the wait period is determined to have elapsed at step S601 in the order of the secondary control units 32 provided in the first secondary apparatus 21, the second secondary apparatus 22, the third secondary apparatus 23, and the fourth secondary apparatus 24.

Then, when determined that the wait period has elapsed (that is, YES at step S601), the secondary control unit 34 turns on the constant current circuit 33 at step S602 and determines whether a predetermined period has elapsed at step S603. When determined that the predetermined period has not elapsed (that is, NO at step S603), the secondary control unit 34 waits. When determined that the predetermined period has elapsed (that is, YES at step S603), the secondary control unit 34 turns off the constant current circuit 33 at step S604.

Next, the secondary control unit 34 determines whether all of the ID confirmation periods have elapsed at step S605. Then, when determined that all of the ID confirmation periods have not elapsed (that is, NO at step S605), the secondary control unit 34 waits. Meanwhile, when determined at all of the ID confirmation periods have elapsed (that is, YES at step S605), the secondary control unit 34 ends the present process.

In addition, when determined that the wait period has not elapsed at step S601 (that is, NO at step S601), the secondary control unit 34 detects the current that flows to the current detecting unit 32 at step S606. In addition, the secondary control unit 34 determines whether the detected current is greater than the fourth threshold at step S607.

When determined that the detected current is greater than the fourth threshold (that is, YES at step S607), the secondary control unit 34 sets the error flag to on at step S608. In addition, when determined that the detected current is equal to or less than the fourth threshold (that is, NO at step S607) or after setting the error flag to on, the secondary control unit 34 performs the processes at step S601 and subsequent steps again.

The foregoing is the ID confirmation process in the ascending order state performed by the secondary control unit 34. In summary, when their IDs are set in ascending order in the first to fourth secondary apparatuses 21 to 24, the wait period is determined to have elapsed at step S601 in the order of the first secondary apparatus 21, the second secondary apparatus 22, the third secondary apparatus 23, and the fourth secondary apparatus 24. In this case, if the ID is normally set, the current does not flow to the current detecting unit 32 of the secondary apparatus before the wait period has elapsed. Therefore, when the current flows to the current detecting unit 32 before the wait period of the secondary control unit 34 has elapsed, the secondary control unit 34 sets the error flag to on.

Figure 12:
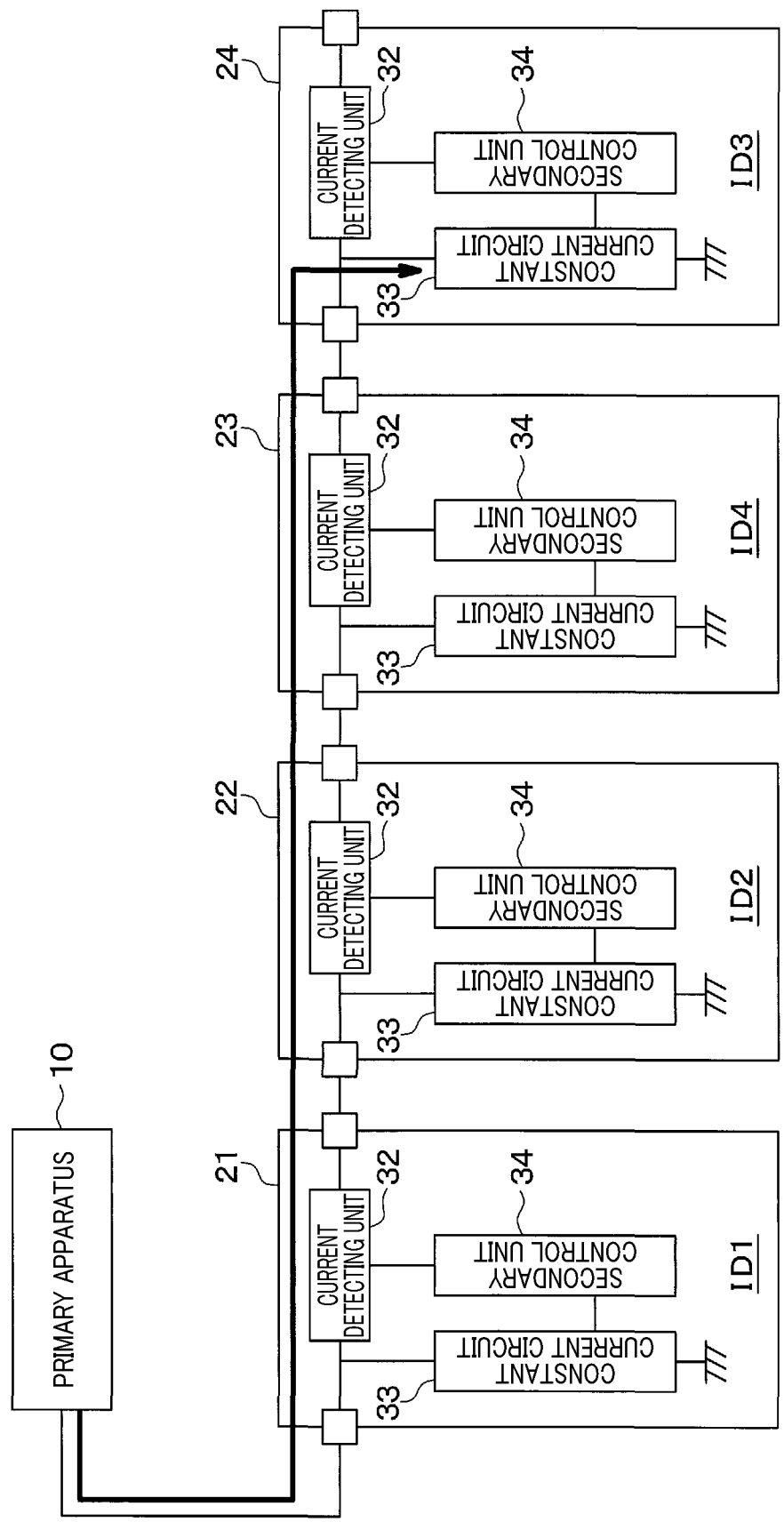
FIG. 12 is a schematic diagram for explaining an example in which an interchange occurs when an ID that is set is confirmed.

For example, as shown in FIG. 12, 1 is set as the ID of the first secondary apparatus 21, and 2 is set as the ID of the second secondary apparatus 22. In addition, 4 is set as the ID of the third secondary apparatus 23, and 3 is set as the ID of the fourth secondary apparatus 24.

In this case, the wait period of the fourth secondary apparatus 24 has elapsed before that of the third secondary apparatus 23. In the third secondary apparatus 23, the current flows to the current detecting unit 32 before the wait period of the third secondary apparatus 23 has elapsed. Therefore, in a case such as this, the secondary control unit 34 of the third secondary apparatus 23 sets the error flag to on. As a result, the primary control unit 11 determines that the error flag is present at step S308, and performs the process to allow the secondary control units 34 to perform the ID setting again. Therefore, the primary control unit 11 suppresses performing various types of control based on erroneous IDs.

As described above, according to the present embodiment, when their IDs are set in the first to fourth secondary apparatuses 21 to 24, the constant current circuit 33 of the secondary apparatus in which the ID is not yet set is turned on and the ID is set in the secondary apparatus in which the current is not flowing to the current detecting unit 32. In addition, when the current flows to the current detecting unit 32 of the secondary apparatus in which the ID is set, their IDs are set again. As a result, their IDs can be prevented from being set in an interchanging manner in the first to fourth secondary apparatuses 21 to 24.

In addition, according to the present embodiment, when their IDs that are set in the first to fourth secondary apparatuses 21 to 24 are confirmed, whether an interchange of their IDs has occurred is determined based on whether the current is flowing to the current detecting unit 32, based on the wait period that is based on the ID that is set. Therefore, an interchange of their IDs can be determined with high accuracy. In addition, their IDs are confirmed in this manner and thus, constituent elements for setting the ID, described above, can be used as is. The system can be prevented from becoming complex.

Furthermore, when determined that the interchange of their IDs has occurred, their IDs are set again in the first to fourth secondary apparatuses 21 to 24. Therefore, the primary control unit 11 can be prevented from performing various types of control based on erroneous IDs.

In addition, according to the present embodiment, the secondary control unit 34 immediately ends the ID setting process when all of ID setting processing periods have elapsed in the ID setting process. In addition, the secondary control unit 34 immediately ends the ID confirmation process when all of the ID confirmation periods have elapsed in the ID confirmation process. That is, the process is immediately ended without an end signal or the like being received from the primary control unit 11. Therefore, for example, compared to when the process is ended after the end signal is received from the primary control unit 11, the process can be prevented from not being ended due to communication error or the like.

Other Embodiments

The present disclosure is described based on the embodiments. However, it is understood that the present disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

For example, according to the above-described first embodiment, an example in which the secondary control unit 34 performs the ID setting and the ID confirmation based on a current is described. However, the first to fourth secondary apparatuses 21 to 24 may include voltage detecting units. The secondary control unit 34 may perform the ID setting and the ID confirmation based on a voltage.

Figure 13:
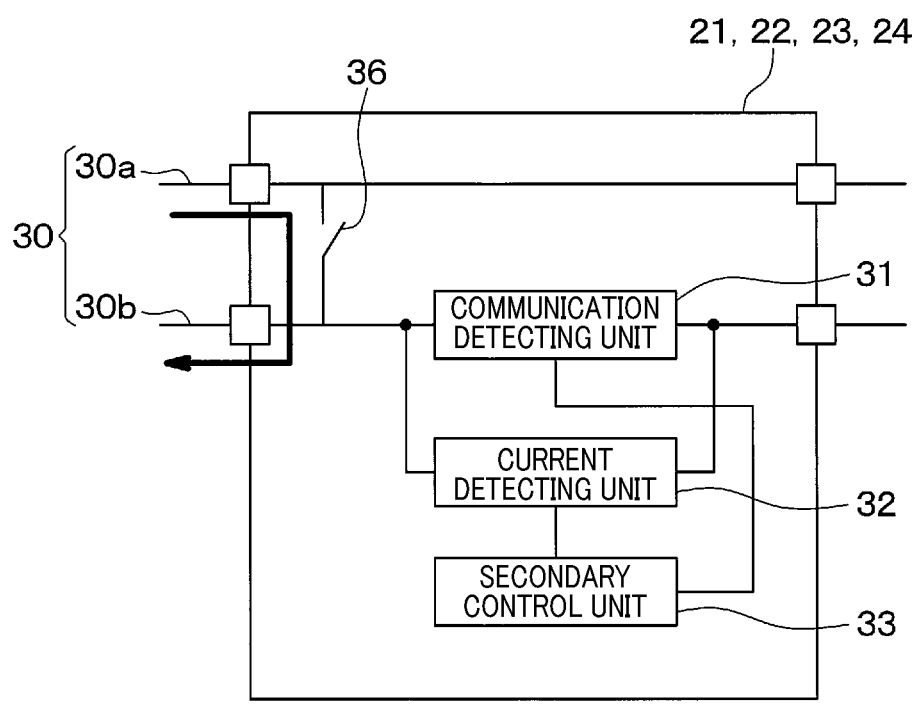
FIG. 13 is a schematic diagram of a configuration of a secondary apparatus according to another embodiment.

In addition, according to the above-described first embodiment, the first to fourth secondary apparatuses 21 to 24 may be configured as shown in FIG. 13. That is, the first to fourth secondary apparatuses 21 to 24 may be configured to be connected to a first communication line 30a and a second communication line 30b. The first communication line 30a and the second communication line 30b may be connected by a switching element 36 that serves as a switching unit.

In a secondary apparatus such as this, in response to the switching element 36 being turned on, as indicated by an arrow in the drawing, a current from the first communication line 30a flows to the second communication line 30b through the switching element 36. That is, for example, when the switching elements of the first to fourth secondary apparatuses 21 to 24 are turned on, a current flows to the current detecting units 32 of the first to third secondary apparatuses 21 to 23. Therefore, a process similar to that according to the above-described first embodiment can be performed.

Furthermore, according to the above-described first embodiment, in the ID setting process, the primary control unit 11 may transmit an end signal when determined that all of the ID setting periods have elapsed. Then, the secondary control unit 34 may end the ID setting process upon receiving the end signal. In a similar manner, in the ID confirmation process, the primary control unit 11 may transmit an end signal when determined that all of the ID confirmation periods have elapsed. Then, the secondary control unit 34 may end the ID confirmation process upon receiving the end signal.

In addition, according to the above-described first embodiment, in the ID setting process, in a manner similar to that in the ID confirmation process, all of the secondary control units 34 may set their IDs in order in response to the primary control unit 11 transmitting the ID setting signal once. In a similar manner, in the ID confirmation process, in a manner similar to that in the ID setting process, one of the secondary control units 34 may process the ID confirmation in response to the primary control unit 11 transmitting the ID confirmation signal once.

Furthermore, according to the above-described first embodiment, an example in which the communication system is applied to a vehicle is described. However, the communication system may be used in applications other than vehicle applications.

The control units 11 and 34 and the method thereof described in the present disclosure may be actualized by a dedicated computer that is provided so as to be configured by a processor and a memory, the processor being programmed to provide one or a plurality of functions that are realized by a computer program. Alternatively, the control units 11 and 34 and the method thereof described in the present disclosure may be actualized by a dedicated computer that is provided by a processor being configured by a single dedicated hardware logic circuit or more. Still alternatively, the control units 11 and 34 and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

What is claimed is:

1. A communication system comprising:
a primary apparatus; and
a plurality of secondary apparatuses that are connected in a daisy chain to the primary apparatus, wherein
the primary apparatus includes
  a primary control unit that allows the plurality of secondary apparatuses to set their own identification information, and
  an output unit that applies a current or a voltage to the plurality of secondary apparatuses,
each of the plurality of secondary apparatuses includes
  a detecting unit that detects the current or the voltage,
  a switching unit that,
    in response to the switching unit being in an on state, allows the current or the voltage from the primary apparatus not to be applied to the detecting unit of the secondary apparatus while allowing the current or the voltage from the primary apparatus to be applied to the detecting unit of at least one other secondary apparatus of the secondary apparatuses that is positioned further toward the primary apparatus side than own secondary apparatus of the secondary apparatuses is, and
    in response to the switching unit being in an off state, allows the current or the voltage from the primary apparatus not to be applied to the detecting unit of the at least one other secondary apparatus that is positioned further toward the primary apparatus side than the own secondary apparatus is and the detecting unit of the own secondary apparatus, and a secondary control unit that performs an identification information setting process for setting the identification information of the secondary apparatus based on a detection result of the detecting unit, based on a setting signal from the primary apparatus, and in the identification information setting process, the secondary control unit, before the identification information is set, turns on the switching unit and sets the identification information in response to the detection result of the detecting unit being equal to or less than a threshold, and after the identification information is set, turns off the switching unit and determines that the setting of the identification information is abnormal in response to the detection result of the detecting unit being greater than the threshold.

2. The communication system according to claim 1, wherein:

in the identification information setting process, the secondary control unit ends the identification information setting process in response to all periods for setting the identification information of the plurality of secondary control units having elapsed.

3. A communication system comprising:

a primary apparatus; and a plurality of secondary apparatuses that are connected in a daisy chain to the primary apparatus, wherein the primary apparatus includes a primary control unit that allows the plurality of secondary apparatuses to confirm identification information that is set, and an output unit that applies a current or a voltage to the plurality of secondary apparatuses, each of the plurality of secondary apparatuses includes a detecting unit that detects the current or the voltage, a switching unit that, in response to the switching unit being in an on state, allows the current or the voltage from the primary apparatus not to be applied to the detecting unit of own secondary apparatus of the secondary apparatuses while allowing the current or the voltage from the primary apparatus to be applied to the detecting unit of at least one other secondary apparatus of the secondary apparatuses that is positioned further toward the primary apparatus side than the own secondary apparatus is, and in response to the switching unit being in an off state, allows the current or the voltage from the primary apparatus not to be applied to the detecting unit of the at least one other secondary apparatus that is positioned further toward the primary apparatus side than the own secondary apparatus is and the detecting unit of the own secondary apparatus, and a secondary control unit that performs an identification information confirmation process for confirming the identification information that is set in the secondary apparatus based on a detection result of the detecting unit, based on a confirmation signal from the primary apparatus, and in the identification information confirmation process, the secondary control unit determines whether an interchange has occurred in the identification information that is set, based on a wait period that is based on the identification information that is set and the detection result of the detecting unit.

4. The communication system according to claim 3, wherein:

in the identification information confirmation process, the secondary control unit ends the identification information confirmation process in response to all periods for confirming the identification information of the plurality of secondary control units having elapsed.

5. The communication system according to claim 4, wherein:

in response to the identification information in which the wait period becomes longer from a side further from the primary apparatus side toward the primary apparatus side being set in order in the plurality of secondary apparatuses, the secondary control unit sets the switching unit to the on state and then to the off state after the wait period has elapsed, and in response to the detection result of the detecting unit being subsequently determined to be greater than a threshold, determines that the identification information that is set is abnormal.

6. The communication system according to claim 4, wherein:

in response to the identification information in which the wait period becomes longer from the primary apparatus side toward a side further from the primary apparatus side being set in order in the plurality of secondary apparatuses, the secondary control unit sets the switching unit to the on state and then to the off state after the wait period has elapsed, and before the wait period has elapsed, in response to the detection result of the detecting unit being determined to be greater than a threshold in a state in which the switching unit is in the off state, determines that the identification information that is set is abnormal.

7. The communication system according to claim 3, wherein:

in response to the identification information in which the wait period becomes longer from a side further from the primary apparatus side toward the primary apparatus side being set in order in the plurality of secondary apparatuses, the secondary control unit sets the switching unit to the on state and then to the off state after the wait period has elapsed, and in response to the detection result of the detecting unit being subsequently determined to be greater than a threshold, determines that the identification information that is set is abnormal.

8. The communication system according to claim 3, wherein:

in response to the identification information in which the wait period becomes longer from the primary apparatus side toward a side further from the primary apparatus side being set in order in the plurality of secondary apparatuses, the secondary control unit sets the switching unit to the on state and then to the off state after the wait period has elapsed, and before the wait period has elapsed, in response to the detection result of the detecting unit being determined to be greater than a threshold in a state in which the switching unit is in the off state, determines that the identification information that is set is abnormal.

* * * * *